(12) United States Patent
Nakayama et al.

(10) Patent No.: US 11,900,745 B2
(45) Date of Patent: Feb. 13, 2024

(54) LOCKER APPARATUS, METHOD FOR CONTROLLING, AND COMPUTER-READABLE RECORDING MEDIUM HAVING STORED THEREIN CONTROLLING PROGRAM

(71) Applicant: FUJITSU LIMITED, Kawasaki (JP)

(72) Inventors: Takayoshi Nakayama, Kawasaki (JP); Kenji Taka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/839,526

(22) Filed: Jun. 14, 2022

(65) Prior Publication Data
US 2023/0096688 A1 Mar. 30, 2023

(30) Foreign Application Priority Data
Sep. 30, 2021 (JP) .................................. 2021-160439

(51) Int. Cl.
*G07C 9/20* (2020.01)
*G06Q 10/0836* (2023.01)
*G07C 9/00* (2020.01)

(52) U.S. Cl.
CPC ........... *G07C 9/20* (2020.01); *G06Q 10/0836* (2013.01); *G07C 9/00912* (2013.01)

(58) Field of Classification Search
CPC ............................. G07C 9/20; G07C 9/00912
See application file for complete search history.

(56) References Cited

U.S. PATENT DOCUMENTS

2022/0192406 A1* 6/2022 Haley .................... A47G 29/20

FOREIGN PATENT DOCUMENTS

| JP | 2015-232801 A | 12/2015 |
| JP | 2019-134378 A | 8/2019 |

* cited by examiner

*Primary Examiner* — Daniell L Negron
(74) *Attorney, Agent, or Firm* — Fujitsu Intellectual Property Center

(57) ABSTRACT

A locker apparatus includes: a memory; and a processor coupled to the memory. The processor executes a process including: first obtaining, from a first terminal of a deliverer of a parcel that stores the parcel into a locker, notification of a first proof issued from a transmission source of the parcel to the deliverer, the first proof including identification information of the parcel, identification information of a receiver of the parcel, and identification information of the transmission source; second obtaining notification of a second proof issued from the transmission source to the receiver, the second proof including identification information of the parcel, identification information of the receiver, and identification information of the transmission source in accordance with permission to store the parcel into the locker; and unlocking the locker when contents of the first proof matches that of the second proof.

20 Claims, 15 Drawing Sheets

LOCKER APPARATUS, METHOD FOR CONTROLLING, AND COMPUTER-READABLE RECORDING MEDIUM HAVING STORED THEREIN CONTROLLING PROGRAM

CROSS-REFERENCE TO RELATED APPLICATION

This application is based upon and claims the benefit of priority of the prior Japanese Patent application No. 2021-160439, filed on Sep. 30, 2021, the entire contents of which are incorporated herein by reference.

FIELD

The embodiment discussed herein is related to a locker apparatus, a method for controlling, and a computer-readable recording medium having stored therein a controlling program.

BACKGROUND

Lockers that accommodate parcels delivered from senders to receivers instead of delivering to the receivers have been prevalent. The "lockers" may include, for example, one or more home delivery lockers or boxes installed in areas such as homes (including apartment buildings), stations, stores, and the like.

[Patent Document] Japanese Laid-open Patent Application No. 2019-134378

[Patent Document] Japanese Laid-open Patent Application No. 2015-232801

Individual lockers are sometimes not dedicated to a particular user, but are shared by multiple users. For example, a parcel destined for a user (as a receiver) is stored (deposited) in an empty locker in which the parcel is not stored. The locker comes to be available as a free locker, i.e., a candidate for storage of a parcel to the receiver or another receiver, after the receiver picks up (receives) the parcel from the locker.

When lockers are shared by multiple users, empty lockers may be short due to parcels destined for a particular receiver occupying multiple lockers.

One of the conceivable solutions to such shortage of empty lockers is to allow a parcel to be additionally deposited by a system that controls depositing and receiving of a parcel into and from one or more lockers, for example. "Additional deposit" means storing multiple parcels destined for the same receiver into one locker, and for example, storing the second and subsequent parcels (subsequent parcels) destined for the receiver who is using the locker into the locker by the system.

However, a system that allows "additionally deposit" has a possibility that, when additional deposit is to be made to a deliverer of a second or later parcel, the deliverer, for example, if a malicious deliverer who is pretending to deliver a subsequent parcel, may steal a parcel (preceding parcel) deposited previously to the subsequent parcel.

SUMMARY

According to an aspect of the embodiments, a locker apparatus includes: a memory; and a processor coupled to the memory, the processor executing a process including: first obtaining, from a first terminal of a deliverer of a parcel that stores the parcel into a locker, notification of a first proof issued from a transmission source of the parcel to the deliverer, the first proof including identification information of the parcel, identification information of a receiver of the parcel, and identification information of the transmission source; second obtaining notification of a second proof issued from the transmission source to the receiver, the second proof including identification information of the parcel, identification information of the receiver, and identification information of the transmission source in accordance with permission to store the parcel into the locker; and unlocking the locker when contents of the first proof matches that of the second proof.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

Figure 1:
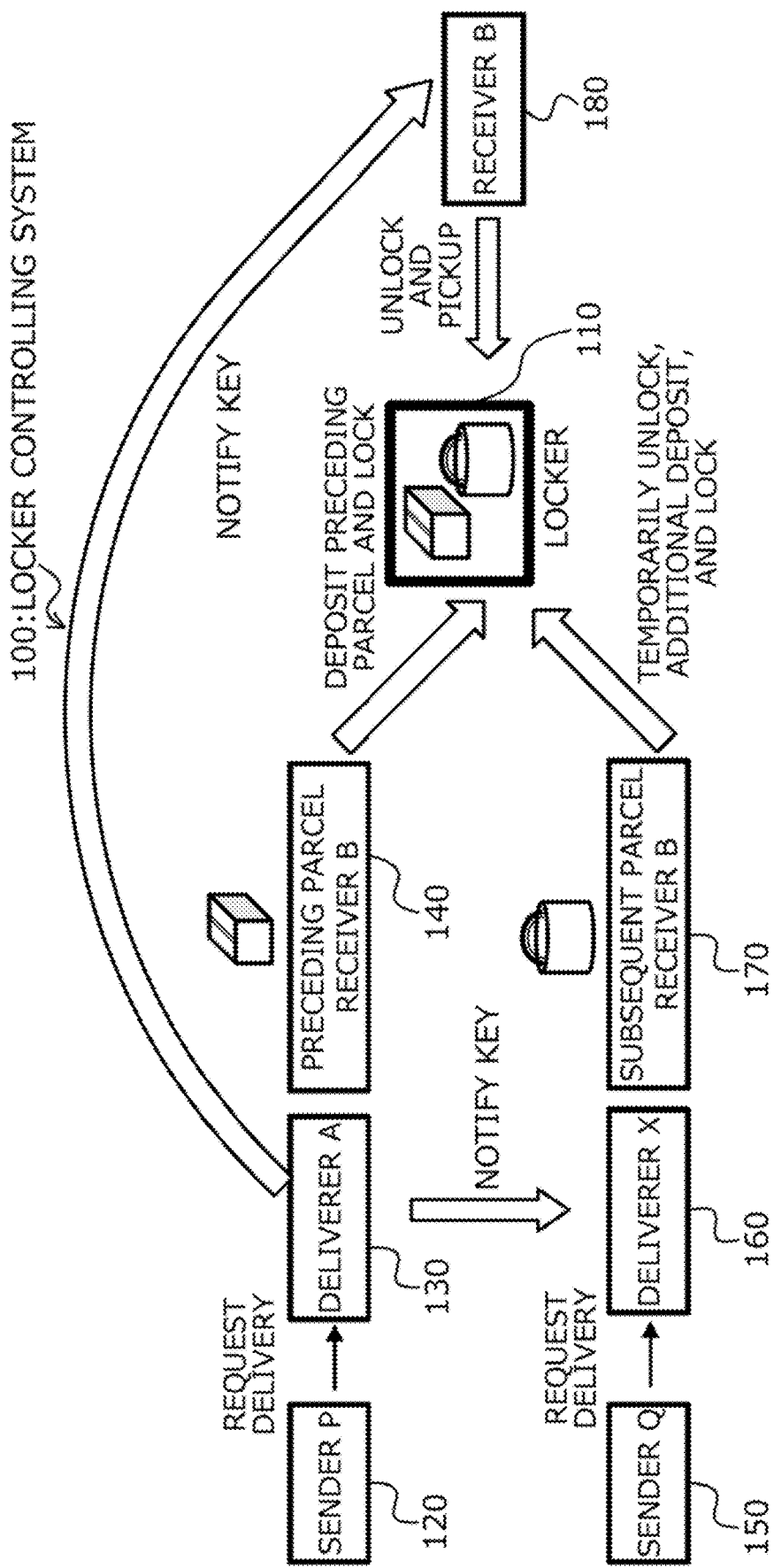
FIG. 1 is a diagram illustrating an example of a process of a locker controlling system according to a comparison example of one embodiment.

Hereinafter, an embodiment of the present invention will now be described with reference to the drawings. However, the embodiment described below is merely illustrative, and there is no intention to exclude application of various modifications and techniques that are not explicitly described below. For example, the present embodiment can be variously modified and implemented without departing from the scope thereof. In the drawings used in the following embodiment, the same reference symbols denote the same or similar parts, unless otherwise specified.

Figure 2:
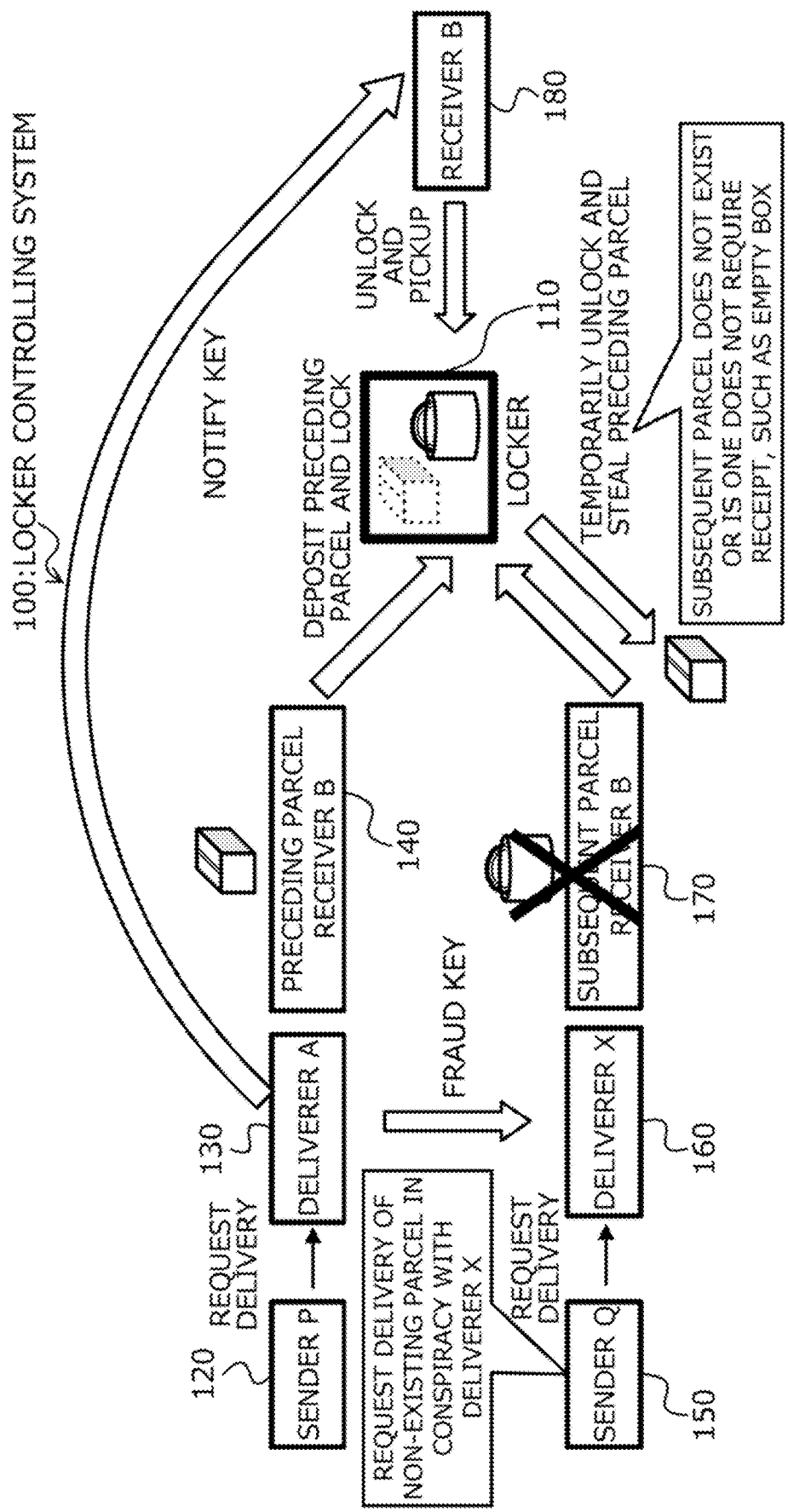
FIG. 2 is a diagram illustrating an example of a process of the locker controlling system according to a comparison example of the one embodiment.

<1> One Embodiment:

<1-1> Locker Controlling System According to Comparison Example:

FIGS. 1 and 2 are diagrams illustrating an example of a locker controlling system 100 according to a comparison example of one embodiment.

As illustrated in FIG. 1, the locker controlling system 100 controls deposit and pickup of a parcel into and from one or more (one in FIG. 1) lockers 110. For example, the locker controlling system 100 locks and unlocks the locker 110 by managing a key such as a passcode.

As illustrated in FIG. 1, in the locker controlling system 100, a sender 120 (P) requests the a deliverer 130 (A) to deliver a parcel destined for a receiver 180 (B), and the sender 150 (Q) requests the deliverer 160 (X) to deliver a parcel destined for a receiver B. The deliverer A deposits (stores) a preceding parcel 140 into locker 110, locks the locker 110, and notifies the receiver B of key information. In addition, the deliverer A notifies the deliverer X of the key information. The deliverer X temporarily unlocks the locker 110 using the notified key information, additionally deposits a subsequent parcel 170, and locks the locker 110. The receiver B unlocks the locker 110 by using the key information notified from the deliverer A, and picks up the preceding parcel 140 and the subsequent parcel 170.

In this manner, if the destinations of the preceding parcel 140 and the subsequent parcel 170 are the same receiver B, the deliverer X temporarily unlocks the locker 110 containing the preceding parcel 140, and additionally deposits the subsequent parcel 170 into the locker 110.

With this configuration, as illustrated in FIG. 2, if the malicious sender Q and the malicious deliverer X conspire together, the deliverer X may unscrupulously obtains the key from the deliverer A and steal the preceding parcel 140.

For the protection from the above, in the one embodiment, description will now be made in relation to an example of a method for making it possible to suppress a steal of the preceding parcel 140 by the deliverer X who pretends to deliver the subsequent parcel 170.

Figure 3:
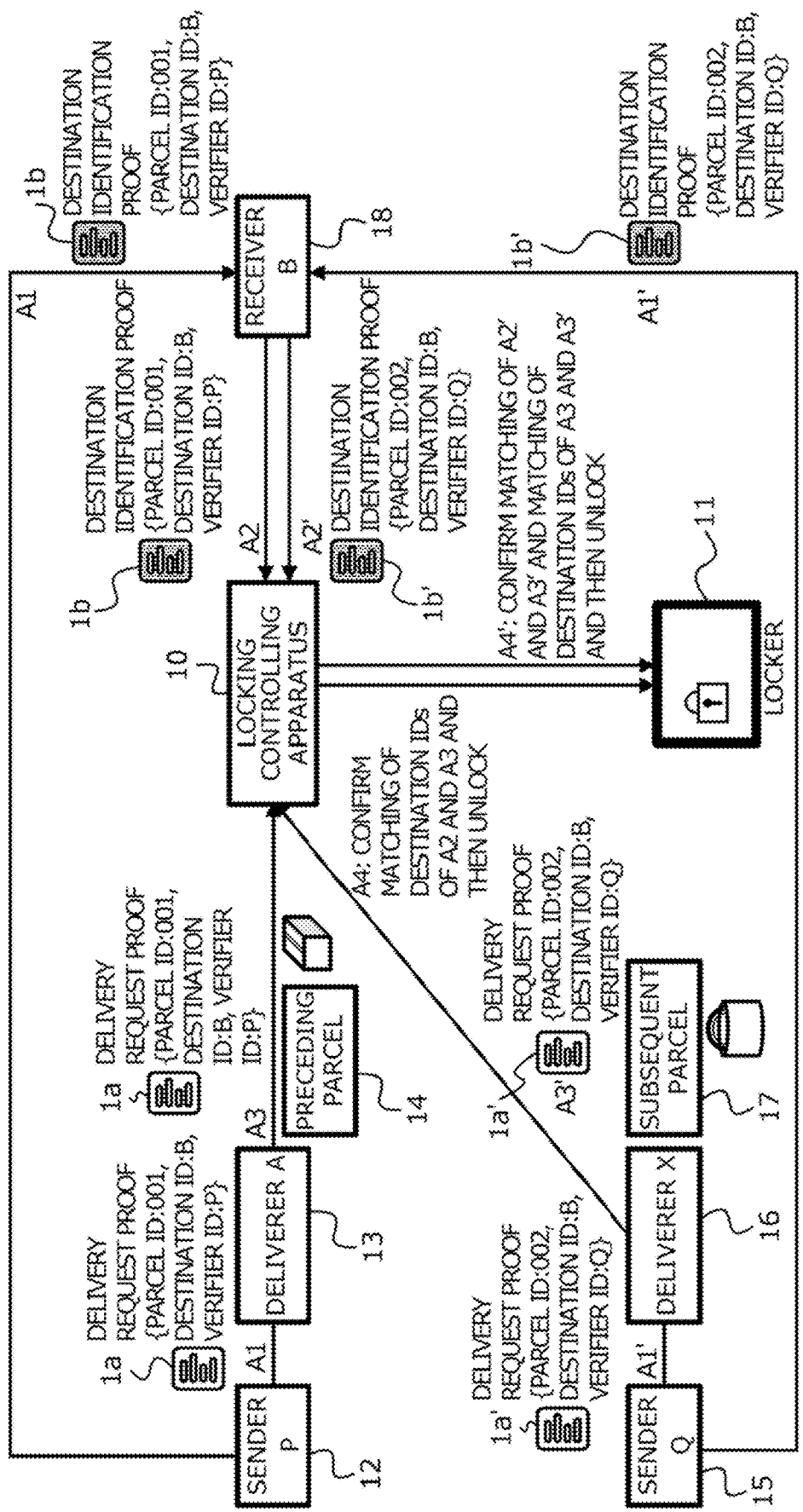
FIG. 3 is a diagram illustrating an example of a process of a locker controlling system according to the one embodiment.

<1-2> Locker Controlling System of One Embodiment:

FIG. 3 is a diagram illustrating an example of a process of a locker controlling system 1 according to the one embodiment and illustrating an example of a depositing process of a parcel of the locker controlling system 1. As illustrated in FIG. 3, the locker controlling system 1 is an example of a locker apparatus, may include a locking controlling apparatus 10, and may provide locker utilization service to users including senders, deliverers, and receivers of parcels.

The locking controlling apparatus 10 may be communicably coupled to each of the one or more (one in FIG. 3) lockers 11, and may control deposit and pickup of parcels into and from the one or more lockers 11. For example, the locking controlling apparatus 10 locks and unlocks each locker (section) 11 by managing a key such as a passcode for each locker 11.

The locking controlling apparatus 10 may manage a used state of one or more lockers 11 (e.g., whether or not to be storing parcels), and may select an empty locker or a locker storing a preceding particle of the receiver as the locker 11 that is to store a parcel on the basis of the used state.

The locker controlling system 1 may include a service system such as an application or a website accessible by a computer (terminal) owned by a user. The service system may register the use of the locker utilization service of each user, perform various communications between the users and the locking controlling apparatus 10, and the like. The communication may include, for example, notification of information such as delivery request proofs 1a and destination identification information 1b that are to be detailed below, notification of messages, and the like. The service system may be included in the locking controlling apparatus 10 or may be a separated system from the lock control device 10. In the following description, the locking controlling apparatus 10 is assumed to include a service system.

In addition, the following description assumes that a receiver knows that the transmission will be made by a particular sender, for example when the receiver purchased a commodity on an EC (Electronic Commerce) website.

(Example of Depositing Process)

In the one embodiment, the locker controlling system 1 causes the sender of a parcel to issue proofs that can be verified to be a "pair" to the deliverer and the receiver. Then, the locker controlling system 1 obtains the respective proofs from the deliverer and the receiver, and compares the obtained proofs to determine, according to the result of the comparison, whether or not a parcel can be additionally deposited.

This prevents a deliver having an improper proof (e.g., a proof not matching that of the receiver) from unlocking of the locker 11, so that it is possible to suppress a steal of the preceding parcel by a deliverer pretending to deliver a subsequent parcel. In other words, it is possible to safely carry out the additional depositing of a parcel.

As illustrated in FIG. 3, the sender 12 (P) issues a delivery request proof 1a to the deliverer 13 (A) and issues a destination identification proof 1b to the receiver 18 (B) (see A1). The sender 15 (Q) issues a delivery request proof 1a' to the deliverer 16 (X) and issues a destination identification proof 1b' to the receiver 18 (B) (see A1').

The delivery request proofs 1a and 1a' are an example of a first proof and are information to certify a delivery request for a parcel to a deliverer. The destination identification proofs 1b and 1b' are examples of the second proofs, and are information to certify a receiver of a parcel. As illustrated in FIG. 3, each of the delivery request proofs 1a and 1a' and the destination identification proofs 1b and 1b' may illustratively include a parcel ID (Identifier), a destination ID, and a verifier ID. In the following description, if the delivery request proofs 1a and 1a' and the destination identification proofs 1b and 1b' are not distinguished from each other, they may be simply referred to as "proofs".

The parcel ID is an example of an identifier for specifying a parcel, and is set to "001" in the delivery request proof 1a and the destination identification proof 1b, and is set to "002" in the delivery request proof 1a' and the destination identification proof 1b'. The parcel ID may be, for example, information such as an order number when the parcel was ordered at the EC site.

The destination ID is an example of an identifier for specifying the issuing destination of the destination identification proof 1b or 1b', and in each proof illustrated in FIG. 3, is set to "B" indicating the receiver B. The destination ID may be, for example, user information of various services used by the receiver B, and may be, as an example, information with which access to the service by a user except for the receiver B is restricted, such as a login ID to the locker utilization service and a mail address of the receiver B.

The verifier ID is an example of an identifier for specifying the issuer of the proof, and is set to "P" indicating the sender P in the delivery request proof 1a and the destination identification proof 1b, and is set to "Q" indicating the sender Q in the delivery request proof 1a' and the destination identification proof 1b'. The verifier ID may be, for example, information guaranteed not to be misrepresented, and may be, for example, information such as an electronic proof issued by the locking controlling apparatus 10 or a certification authority of a third party or the like.

The receiver B transmits the destination identification proof 1b or 1b' to the locking controlling apparatus 10 when the destination identification proof 1b or 1b' is intended for a parcel that the receiver B will pick up (see A2 and A2'). For example, the receiver B (or the service system) may determine that the destination identification proof 1b or 1b' is a parcel to be picked up if one or the both of the following (i) and (ii) are satisfied.
  (i) The parcel ID included in the destination identification proofs 1b and 1b' match the parcel ID (e.g., order number) of the ordered commodity.
  (ii) The verifier ID included in the destination identification proofs 1b and 1b' match the ID of the sender (e.g., seller information) of the ordered commodity.

The deliverer A and X notify the locking controlling apparatus 10 of the delivery request proofs 1a and 1a', respectively, when attempting to deposit respective parcels into the locker 11 (see A3 and A3'). The "notification" to the locking controlling apparatus 10 may include "transmission" via the service system, or "presentation" or "inputting" of information into an IF (Interface) provided in the vicinity of the locker 11. The IF may be, for example, a scanner or a camera that reads information of various bar codes displayed on screens of terminals, a reader that reads information from IC (Integrated Circuit) chips of terminals, or inputting devices such as touch panels or keyboards. The IF may output the obtained information to the locking controlling apparatus 10.

The locking controlling apparatus 10 stores information included in the delivery request proofs 1a and 1a', determines whether or not to unlock the locker 11, and selects the locker 11 to be unlocked. If determining to unlock the locker 11, the locking controlling apparatus 10 unlocks the selected locker 11, and when the locker 11 is closed (when parcel is deposited), the locking controlling apparatus 10 locks the locker 11 (see A4 and A4').

For example, the locking controlling apparatus 10 may determine whether or not to unlock the locker 11 depending on whether or not the receiver B is using the locker 11.

As an example, when the receiver B is not using the locker 11, the locking controlling apparatus 10 may determine to unlock the locker 11 if the following condition (I) is satisfied.

(I) The lock controller 10 has received a destination identification proof 1b or 1b' all the parameters of which match the corresponding parameters included in the deliver request proof 1a or 1a' of the parcel (see the decisions of A4 and A4'). The all parameters include, for example, a parcel ID, a destination ID, and a verifier ID.

When the receiver B is not using the locker 11 and the above condition (I) is satisfied, the locking controlling apparatus 10 may determine to unlock the locker 11 and may select an empty locker 11 of the one or more lockers 11 to be the locker 11 that is to store the preceding parcel 14.

In the example of FIG. 3, the locking controlling apparatus 10 determines that the parcel ID "001", the destination ID "B", and the verifier ID "P" of the delivery request proof 1a match those of the destination identification proof 1b, and unlocks the locker 11.

When detecting that the deliverer A, who has stored the preceding parcel 14 in the locker 11, has closed the door, the locking controlling apparatus 10 locks the locker 11.

On the other hand, when the receiver B is using the locker 11, the locking controlling apparatus 10 may determine to unlock the locker 11 when the following condition (II) is satisfied in addition to the above condition (I). The case where the receiver B is using the locker 11 corresponds to the case where the locking controlling apparatus 10 receives the delivery request proof 1a' under a circumstance where the preceding parcel 14 exists in the locker 11 in the example of FIG. 3.

(II) The destination ID included in the delivery request proof 1a' matches the destination ID included in the delivery request proof 1a of the preceding parcel 14 stored in the locker 11 being used by the receiver B (see the determination of A4').

When the receiver B is using the locker 11 and the conditions (I) and (II) are satisfied, the locking controlling apparatus 10 may determine to unlock the locker 11, and select the locker 11 being used by the receiver B as the locker 11 that is to store a subsequent parcel 17.

In the example of FIG. 3, the locking controlling apparatus 10 determines that the parcel ID "002", the destination ID "B", and the verifier ID "Q" of the delivery request proof 1a' match those of the destination identification proof 1b', and unlocks the locker 11 in which the preceding parcel 14 is stored. When detecting that the deliverer X, who has stored the subsequent parcel 17 in the locker 11, has closed the door, the locking controlling apparatus 10 locks the locker 11.

The determination as to whether or not the receiver B is using the locker 11 may be made on the basis of, for example, the used state of the locker 11. An example of the used status may include, for each locker 11, information that associates information indicating whether or not the locker 11 is being used and, when the locker 11 is being used, the destination ID of the receiver 18 using the locker 11 with each other. For example, the locking controlling apparatus 10 may determine whether or not the locker 11 associated with the destination ID of the receiver B exists in the used state.

(Example of Process Performed when Locker 11 is Not Unlocked in the Depositing Process)

As described above, according to the locker controlling system 1 of the one embodiment, even if a malicious user pretends to be the deliverer X of the subsequent parcel 17 in the depositing process, the delivery request proof and the destination identification proof do not match each other. Therefore, the locking controlling apparatus 10 does not unlock the locker 11, and can suppress a steal of the preceding parcel 14.

Figure 4:
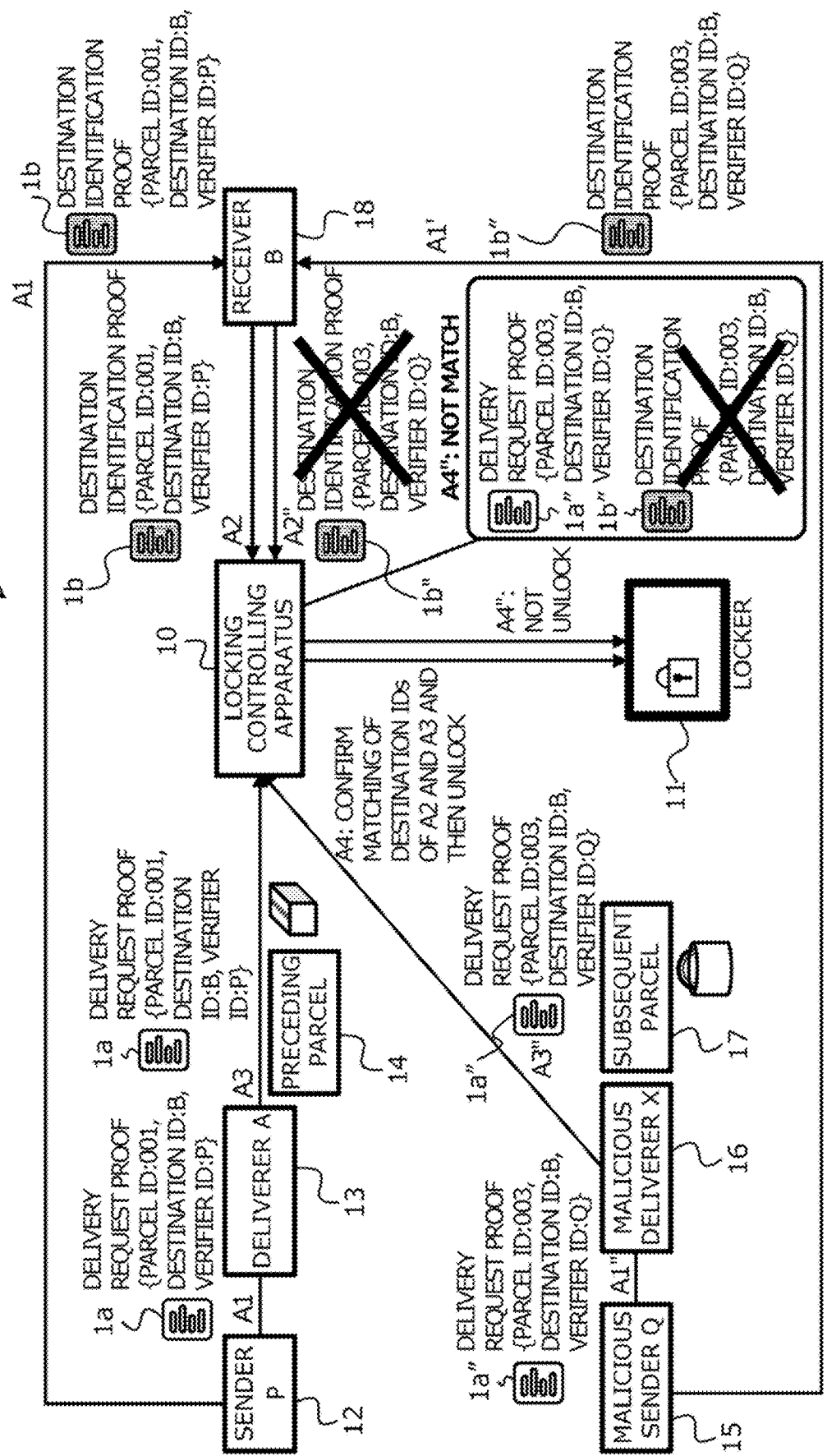
FIG. 4 is a diagram illustrating an example of a process of the locker controlling system according to the one embodiment when a user is pretending a deliverer of a subsequent parcel.

FIG. 4 is a diagram illustrating an example of a process of the locker controlling system 1 when a user is pretending a deliverer of the subsequent parcel 17. Hereinafter, it is assumed that a malicious sender Q and a malicious deliverer X conspire together to attempt unscrupulously obtaining of the preceding parcel 14. For example, the sender Q requests the deliverer X to deliver a fictitious subsequent parcel 17, and the deliverer X delivers the subsequent parcel 17, such as a non-existing parcel or an empty box that does not require receipt.

In FIG. 4, since the correspondence among the delivery request proof 1*a*, the destination identification proof 1*b* relating to the preceding parcel 14, and the receiver B relating to the preceding parcel 14 is the same as that in the example of FIG. 3, so the description thereof is omitted here.

As illustrated in FIG. 4, the sender Q issues a delivery request proof 1*a"* to the deliverer X and issues a destination identification proof 1*b"* to the receiver B (see A1"). The parameters of a delivery request proof 1*a"* and a destination identification proof 1*b"* are the parcel ID "003", the destination ID "B", and the verifier ID "Q".

The receiver B (service system) has not ordered a commodity having an order number and seller information matching the parcel ID and the verifier ID contained in the destination identification proof 1*b"*, respectively (see above (i) and (ii)). For the above, the receiver B determines that the parcel targeted by the destination identification proof 1*b"* is not in mind (is not scheduled to receive), and suppresses the transmission of the destination identification proof 1*b"* to the locking controlling apparatus 10 (see A2").

When attempting to deposit a parcel into the locker 11, the deliverer X notifies the locking controlling apparatus 10 of the delivery request proof 1*a"* (see A3").

The locking controlling apparatus 10 stores information included in the delivery request proof 1*a"*, determines whether or not to unlock a locker 11, and selects the locker 11 to unlock.

In the example of the subsequent parcel 17 of FIG. 4, since the receiver B is using the locker 11 (the preceding parcel 14 is existing), the locking controlling apparatus 10 determines whether or not the above conditions (I) and (II) are satisfied.

With respect to the above condition (II), since the destination ID "B" included in the delivery request proof 1*a"* matches the destination ID "B" included in the delivery request proof 1*a* of the preceding parcel 14 being stored in the locker 11 that the receiver B is using, the condition (II) is determined to be satisfied.

On the other hand, with respect to the above condition (I), since the locking controlling apparatus 10 has not received the destination identification proof 1*b"* all the parameters of which match the corresponding parameters included in the deliver request proof 1*a"* (not being transmitted in A2"), the condition (I) is determined not to be satisfied.

Accordingly, the locking controlling apparatus 10 does not unlock the locker 11 (see A4") because at least (I) between the above conditions (I) and (II) is not satisfied. In this occasion, for example, the locking controlling apparatus 10 may notify the deliverer X that the locker 11 is not to be unlocked. The "notification" may include, for example, transmission (displaying) of a message from the service system to the terminal, and displaying on a display device such as a monitor in the vicinity of the locker 11.

(Example of Pickup Process)

Figure 5:
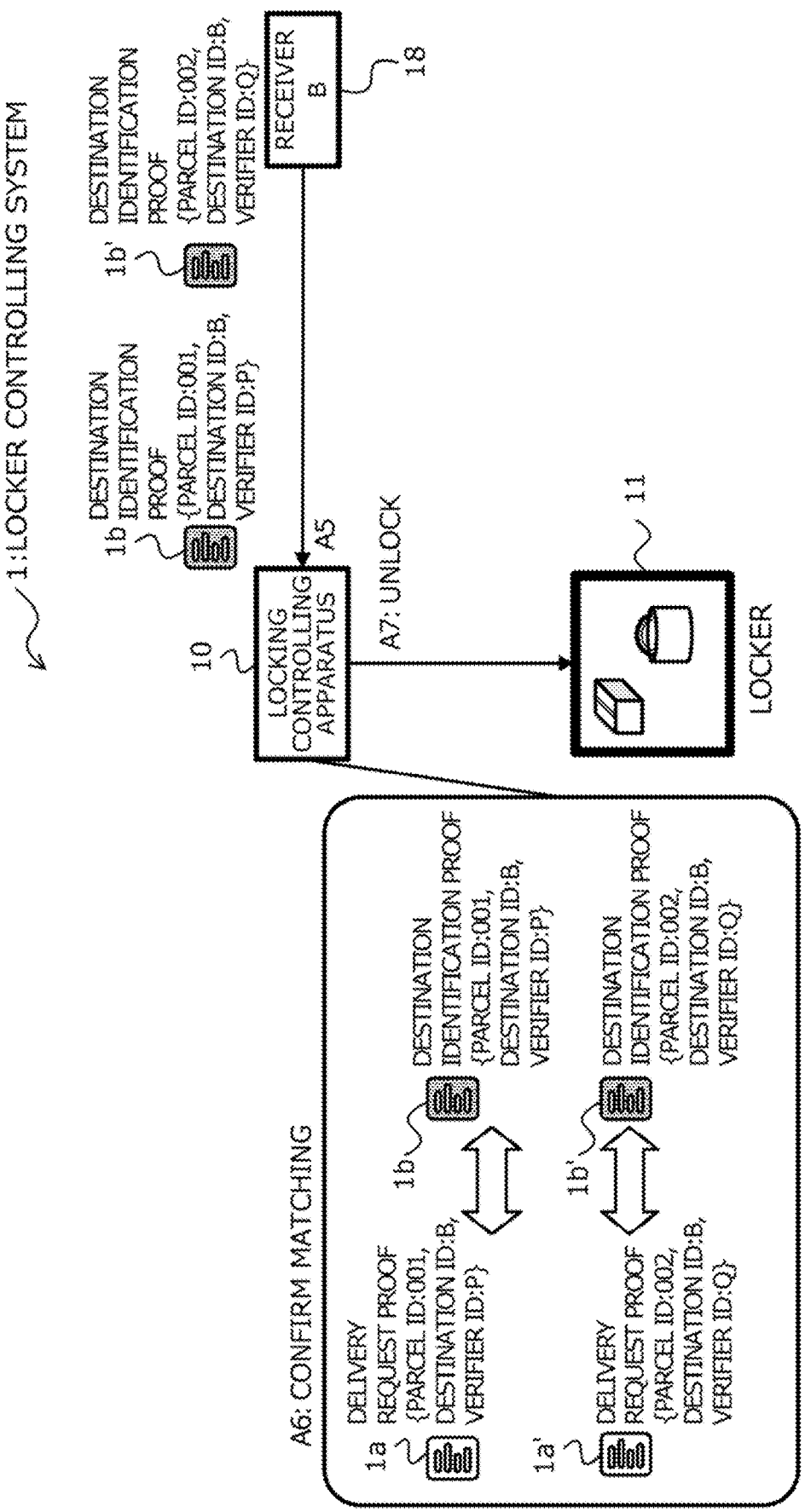
FIG. 5 is a diagram illustrating an example of a process of the locker controlling system according to the one embodiment.

FIG. 5 is a diagram illustrating an example of a process of the locker controlling system 1 according to the one embodiment and illustrating a pickup process of a parcel in the locker controlling system 1.

As illustrated in FIG. 5, when picking up the parcel stored in the locker 11, the receiver B notifies the locking controlling apparatus 10 of the destination identification proofs 1*b* and 1*b'* (see A5). The "notification" to the locking controlling apparatus 10 may include "transmission" via the service system, or "presentation" or "inputting" of information into an IF provided in the vicinity of the locker 11.

Upon obtaining the destination identification proofs 1*b* and 1*b'* from the receiver B, the locking controlling apparatus 10 determines whether or not all the parameters included in the delivery request proofs 1*a* and 1*a'* that the locking controlling apparatus 10 stores match the corresponding parameters included in the destination identification proofs 1*b* and 1*b'* (see A6). The all parameters include, for example, a parcel ID, a destination ID, and a verifier ID.

If the delivery request proofs match the destination identification proofs, the locking controlling apparatus 10 unlocks the locker 11 associated with the receiver B, and after the locker 11 is closed (after the preceding parcel 14 and the subsequent parcel 17 are removed), locks the locker 11 (see A7).

An example of a case where the delivery request proofs match the destination identification proofs is a case where all the parameters relating to all the parcels 14 and 17 destined for the receiver B match (completely match).

An alternative example of a case where the delivery request proofs match the destination identification proofs is a case where the parameters relating to at least one of the parcels 14 and 17 destined for the receiver B match.

When determining not to unlock that the locker 11, the locking controlling apparatus 10 may notify the receiver B that the locker 11 is not to be unlocked, for example. The "notification" may include, for example, transmission (displaying) of a message from the service system to the terminal, and displaying on a display device such as a monitor in the vicinity of the locker 11.

Figure 6:
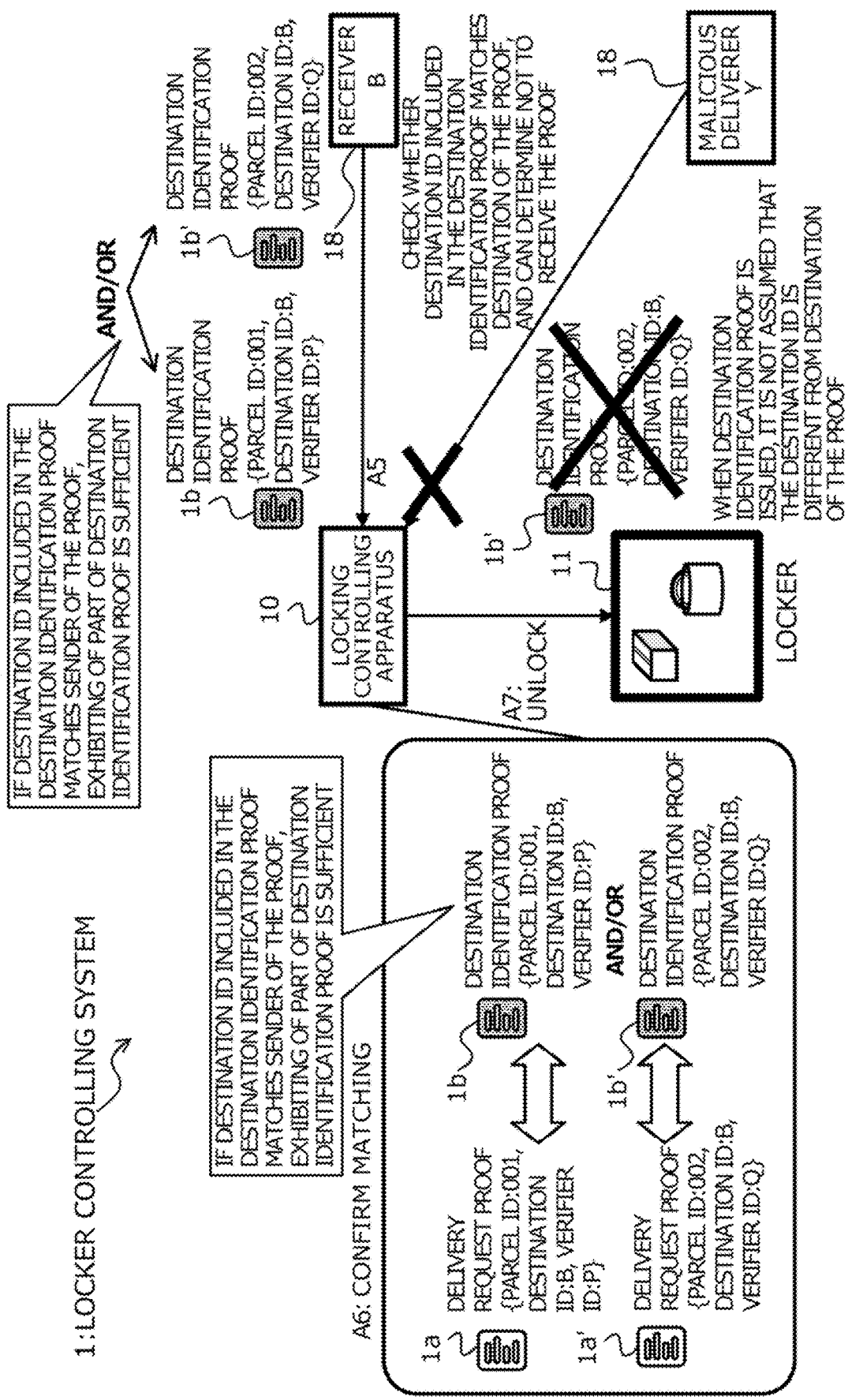
FIG. 6 is a diagram illustrating an example of a process of the locker controlling system according to the one embodiment when a user different from a receiver is pretending the receiver.

FIG. 6 is a diagram illustrating an example of a process of the locker controlling system 1 according to the one embodiment when a user (receiver Y) different from the receiver B is pretending the receiver B. This example assumes that the receiver Y notifies the locking controlling apparatus 10 of the destination identification proof 1*b'* instead of the receiver B, and attempts to unscrupulously obtain the preceding parcel 14.

The destination ID in the destination identification proof indicates the issuing destination when the destination identification proof is issued from the sender 12 or 15 to the receiver 8. For the above, this example does not assume that the issuing destination of the destination identification proof is different from the destination ID.

In preparation for a case where a destination identification proof 1*b'* having a different destination ID from the issuing destination of the destination identification proof is issued to a malicious receiver Y (see FIG. 6), the locking controlling apparatus 10 may determine (confirm) whether or not the sender (receiver Y) matches the destination ID included in the destination identification proof when receiving the destination identification proof 1*b'*. This makes it possible to inhibit the malicious receiver Y from unscrupulously receiving the parcel by causing the locking controlling apparatus 10 to receive the destination identification proof 1*b'*.

As the above, the locker controlling system 1 does not assume that the invalid receiver Y forges the destination identification proof 1*b'* destined for the receiver B to cause the locking controlling apparatus 10 to receive the receiver proof 1*b'*. In other words, the depositing process guarantees that all the parcels 14 and 17 deposited in the locker 11 of the same section are destined for the same receiver 18.

Therefore, when the receiver B notifies the locking controlling apparatus 10 of the destination identification proofs 1b and 1b' in order to pick up the parcel, it is sufficient only to indicate the identification of the receiver B. In other words, if the destination ID included in the destination identification proofs 1b and 1b' match the sender of the proofs 1b and 1b' i.e., the (receiver B), it is not essential to notify the destination identification proofs 1b and 1b' of all the parcels. For example, it is sufficient for the receiver B to notify the locking controlling apparatus 10 of the receiver identification proof 1b or 1b' of any one of the parcels in the locker 11 that is to be unlocked.

From the above, the locking controlling apparatus 10 may determine to unlock the locker 11 if the parameters of one parcel match between the delivery request proof 1a and the destination identification proof 1b (the preceding parcel 14) or between the delivery request proof 1a' and the destination identification proof 1b' (the subsequent parcel 17).

Incidentally, for example, a rare case is assumed in which a part of the receiver proof 1b' is counterfeited and the sender of the destination identification proof 1b' when being to be sent to the locking controlling apparatus 10 is misrepresented. In order to prevent unscrupulous picking up (fraud) of the parcel in the case, it is effective to determine that the locker 11 is unlocked when the destination identification proofs 1b and 1b' for all the parcels 14 and 17 destined for the receiver B are notified and all the parameters are matched (completely matched), as illustrated in FIG. 5.

<1-3> Example of Configuration of Locking Controlling Apparatus:

Next, description will now be made in relation to an example of the configuration of a locking controlling apparatus 10 in the locker controlling system 1 with reference to FIGS. 3-6.

<1-3-1> Example of Hardware Configuration:

The locking controlling apparatus 10 according to the one embodiment is an example of a computer or an information processing apparatus. The locking controlling apparatus 10 may be, for example, a Virtual Machine (VM) or a physical machine. The functions of the locking controlling apparatus 10 may be realized by one computer or by two or more computers. Further, at least some of the functions of the locking controlling apparatus 10 may be implemented by using HW resources and Network (NW) resources provided by cloud environments.

Figure 7:
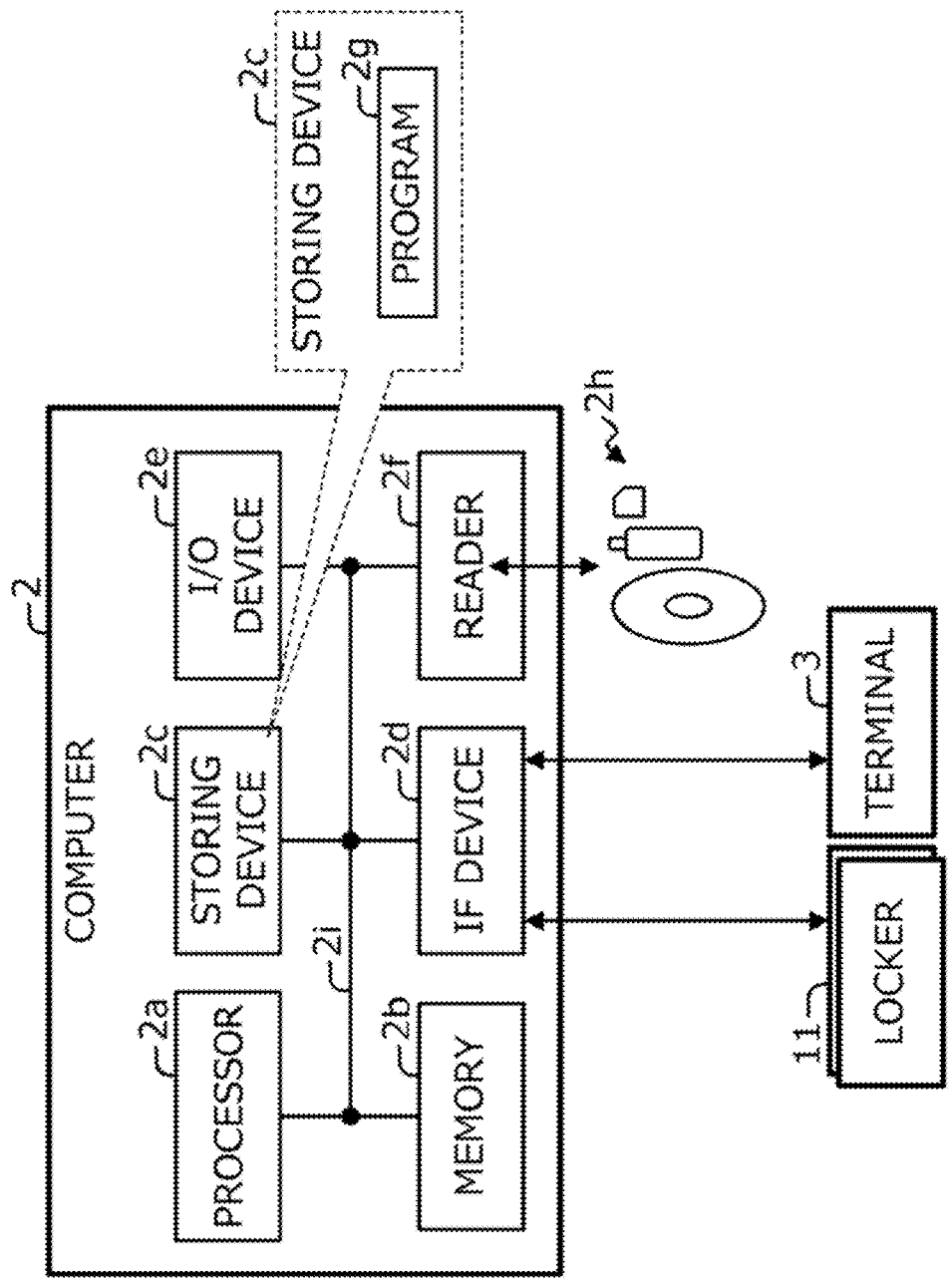
FIG. 7 is a block diagram schematically illustrating an example of a hardware (HW) configuration of a computer that achieves a function of a locking controlling apparatus.

FIG. 7 is a block diagram schematically illustrating an example of a hardware (HW) configuration of a computer that achieves a function of the locking controlling apparatus 10. If multiple computers are used as a HW resources that achieves the function of the locking controlling apparatus 10, each computer may have the configuration illustrated in FIG. 7.

As illustrated in FIG. 7, the computer 2 may illustratively include, as the HW configuration, a processor 2a, a memory 2b, a storing device 2c, an InterFace (IF) device 2d, an Input-Output device 2e, and a reader 2f.

The processor 2a is an example of an arithmetic processing device that performs various types of control and calculations. The processor 2a may be communicably connected to each of the blocks in the computer 2 via a bus 2i. The processor 2a may be a multi-processor including multiple processors and a multi-core processor including multiple processor cores, and may have a structure including multi-core processors.

The processor 2a may be any one of integrated circuits (ICs) such as Central Processing Units (CPUs), Micro Processing Units (MPUs), Graphics Processing Units (GPUs), Accelerated Processing Units (APUs), Digital Signal Processors (DSPs), Application Specific Integrated Circuits (ASICs), and Field Programmable Gate Arrays (FPGAs), or combinations of two or more of these ICs.

The memory 2b is an example of HW that stores various data and programs. The memory 2b may be one or the both of a volatile memory such as a Dynamic Random Access Memory (DRAM) and a non-volatile memory such as a Persistent Memory (PM).

The storing device 2c is an example of HW that stores various data, programs, and the likes. Examples of the storing device 2c may be various storing devices including a magnetic disk device such as an HDD, a semiconductor drive device such as an SSD, and a nonvolatile memory. The non-volatile memory may be, for example, a flash memory, a Storage Class Memory (SCM), a Persistent Memory (PM), a Read Only Memory (ROM), and the like.

The storing device 2c may store a program (controlling program) 2g that implements all or a part of various functions of the computer 2.

For example, the processor 2a of the locking controlling apparatus 10 can achieve the function of the locking controlling apparatus 10, such as a controlling unit 25 of the locking controlling apparatus 20 that is to be detailed below with reference to FIG. 8, by expanding the program 2g stored in the storing device 2c on the memory 2b and executing the expanded program 2g.

The IF device 2d is an example of a communication IF that controls connection and communication with one or the both of the networks including a network between the locking controlling apparatus 10, terminals 3 (see FIG. 8) owned by the sender, the deliverers and the receiver, and one or more lockers 11. For example, the IF device 2d may include an applying adapter conforming to Local Area Network (LAN) such as Ethernet (registered trademark) or optical communication such as Fibre Channel (FC). The applying adapter may be compatible with one of or both of wireless and wired communication schemes.

For example, the locking controlling apparatus 10 may be communicably connected to each of the multiple terminals and one or more lockers 11 via IF device 2d and the network. The locking controlling apparatus 10 may be connected to each of the one or more lockers 11 via the IF device 2d and a controlling signal line to control unlocking and locking the lockers 11. Furthermore, the program 2g may be downloaded from the network to the computer through the communication IF and be stored in the storing device 2c.

The IO device 2e may include one or both of an input device and an output device. Examples of the input device include a keyboard, a mouse, and a touch panel. Examples of the output device include a monitor, a projector, and a printer. The IO device 2e may be include, for example, a touch panel that integrates an input device and an output device with each other.

The input device of the IO device 2e is an example of an IF to "notify" the locking controlling apparatus 10 of a delivery request proof and a destination identification proof from a deliverer and a receiver. For example, the input device may be used for notification of a delivery request proof 1a, 1a' from a deliverer 13, 16 illustrated in FIG. 3 (see A3 and A3') and notification of a destination identification proof 1b, 1b' from the receiver B illustrated in FIGS. 5 and 6 (see A5).

The output device of the IO device 2e is an example of an IF to "notify" the locking controlling apparatus 10 of a deliverer and a receiver of information such as a message or the like. For example, the output device may be used for notification of a message as to whether a locker 11 is to be unlocked or not to be unlocked to the deliverer 13, 16 of FIGS. 3 and 4 and the receiver B of FIGS. 5 and 6.

The reader 2f is an example of a reader that reads data and programs recorded on a recording medium 2h. The reader 2f may include a connecting terminal or device to which the recording medium 2h can be connected or inserted. Examples of the reader 2f include an applying adapter conforming to, for example, Universal Serial Bus (USB), a drive apparatus that accesses a recording disk, and a card reader that accesses a flash memory such as an SD card. The program 2g may be stored in the recording medium 2h. The reader 2f may read the program 2g from the recording medium 2h and store the read program 2g into the storing device 2c.

The recording medium 2h is an example of a non-transitory computer-readable recording medium such as a magnetic/optical disk, and a flash memory. Examples of the magnetic/optical disk include a flexible disk, a Compact Disc (CD), a Digital Versatile Disc (DVD), a Blu-ray disk, and a Holographic Versatile Disc (HVD). Examples of the flash memory include a semiconductor memory such as a USB memory and an SD card.

The reader 2f may include one or the both of a scanner or a camera that reads information of various barcodes displayed on the screen of each terminal 3 and a reader that reads information from an IC chip of each terminal 3.

The terminals 3 may each have the same hardware configuration as that of the computer 2 described above. The terminal 3 may be an example of a computer or an information processing apparatus and may be an information processing terminal exemplified by a smartphone, a tablet terminal, and a Personal Computer (PC).

The HW configuration of the computer 2 described above is illustrative. Accordingly, the computer 2 may appropriately undergo increase or decrease of HW devices (e.g., addition or deletion of arbitrary blocks), division, integration in an arbitrary combination, and addition or deletion of the bus.

Figure 8:
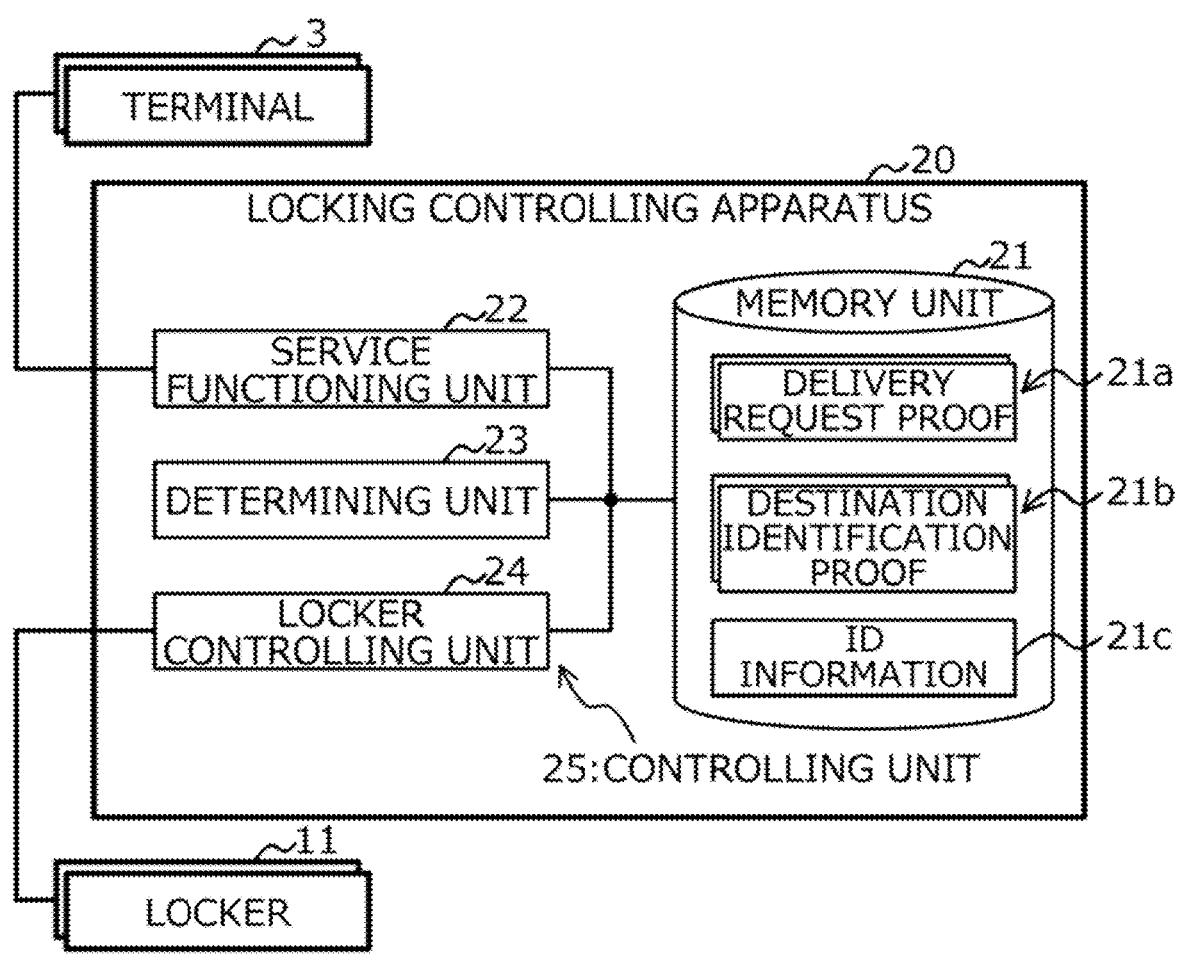
FIG. 8 is a block diagram schematically illustrating an example of a functional configuration of the locking controlling apparatus according to an example of the one embodiment.

<1-3-2> Example of Functional Configuration:

FIG. 8 is a block diagram schematically illustrating an example of a functional configuration of the locking controlling apparatus 20 being an example of the locking controlling apparatus 10 according to an example of the one embodiment. As illustrated in FIG. 8, the locking controlling apparatus 20 may illustratively include a memory unit 21, a service functioning unit 22, a determining unit 23, and a locker controlling unit 24. The service functioning unit 22, the determining unit 23, and the locker controlling unit 24 are an example of a controlling unit 25.

The memory unit 21 is an example of a storing region, and stores various data used by the locking controlling apparatus 20. The memory device 21 may be achieved by, for example, a storing region that at least one of the memory 10b and the storing device 10c illustrated in FIG. 7 has.

As illustrated in FIG. 8, the memory unit 21 may illustratively be capable of storing one or more delivery request proofs 21a, one or more destination identification proofs 21b, and ID information 21c.

The service functioning unit 22 may execute a service system that provides a locker utilization service through the use of an application, a Web site, or the like to the terminal 3 of a user such as a sender, a deliverer, or a receiver. If the service system is implemented by an application, the terminal 3 may be provided with an application (agent) that communicates with the service functioning unit 22 (server-side application). If the service system is implemented by a Web site, the terminal 3 may be provided with a Web browser that accesses the Web site.

For example, the service functioning unit 22 may perform user registration, communication of various information (see A1-A3, A1'-A3', A1"-A3", A5) between users and between a user and the locking controlling apparatus 20 illustrated in FIGS. 3 and 4 on the service system. In this communication, the service functioning unit 22 may store, into the memory unit 21, the delivery request proof 21a and the destination identification proof 21b issued by the senders 12 and 15 on the service system, for example.

In other words, the transmission of the proofs between users and between a user and the locking controlling apparatus 20 illustrated in FIGS. 3 and 4 may be achieved by the user accessing the service functioning unit 22 via the terminal 3 and operating on the service system provided by the service functioning unit 22. The same applies to the following description. In the following description, the terminal 3 of the deliverer is an example of the first terminal of the deliverer, and the terminal 3 of the receiver is an example of the second terminal of the delivery destination.

The service functioning unit 22 according to one embodiment may obtain, from the first terminal of the deliverer who deposits the parcel into the locker 11, the notification of the delivery request proof 21a issued by the sender to the deliverer of the parcel. In addition, the service functioning unit 22 may obtain the notification of the destination identification proof 21b issued from the sender to the receiver in response to the permission to deposit the parcel into the locker 11.

The determining unit 23 determines whether or not to unlock the locker 11 on the basis of the delivery request proof 21a and the destination identification proof 21b obtained by the service functioning unit 22, and selects the locker 11 to unlock when determined to unlock the locker 11. For example, the determining unit 23 may make determination of A4, A4', A4" and A6 of FIGS. 3 and 4.

The locker controlling unit 24 controls unlocking and locking of the locker 11 according to the determination result of the determining unit 23. For example, the locker control unit 24 may perform the unlocking process or the unlocking suppressing process of A4, A4', A4", and A7 of FIGS. 3 and 4.

<1-3-3> Description of Service Functioning Unit and Determining Unit:

Hereinafter, description will now be made examples of processing of the service functioning unit 22 and the determining unit 23.

(Verifying Process of Verifier ID)

The verifier ID attached to each proof is an identifier that identifies the issuer of the proof, and is information that is guaranteed not to be misrepresented. In order to ensure the validity of the verifier ID, the service functioning unit 22 may verify (confirm) that the verifier ID is valid (not fraud), for example, when a proof is transmitted between users or between a user and the locking controlling apparatus 20.

As an example, the service functioning unit 22 may assign an electronic signature of the sender 12 or 15 to each of the delivery request proof 21a and the destination party proof 21b issued by the sender 12 or 15. An electronic signature may be information such as an electronic certificate issued by the locking controlling apparatus 10, a certification authority of a third party or the like, and may be attached to these proofs, or may be included in each proof as a verifier ID.

Figure 9:
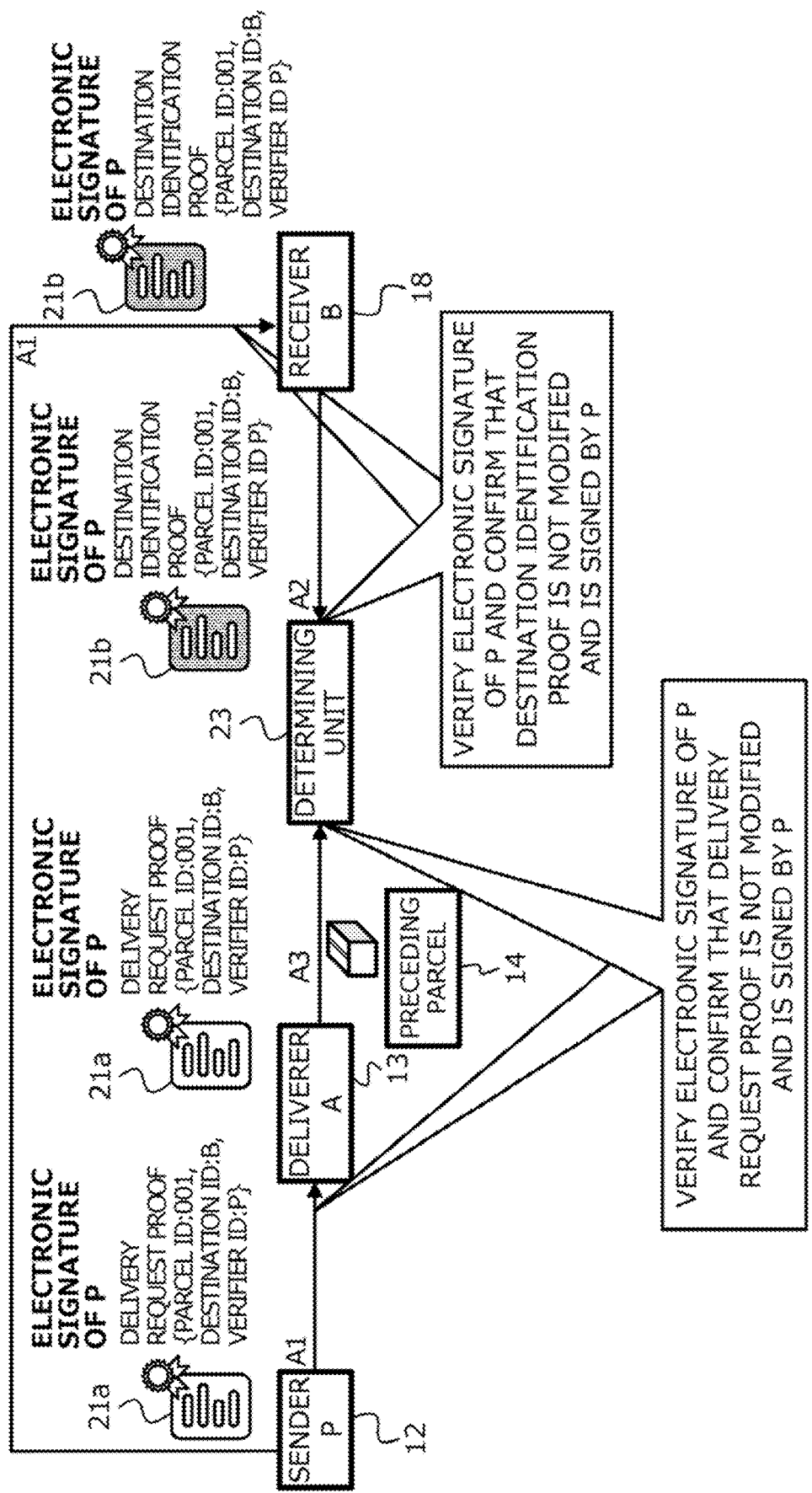
FIG. 9 is a diagram illustrating an example of a verifying process of a proof by a service functioning unit.

FIG. 9 is a diagram illustrating an example of a verifying process of a proof by the service functioning unit 22. As illustrated in FIG. 9, the service functioning unit 22 may verify the electronic signature of the sender P assigned to the delivery request proof 21a (see A1) transmitted from the sender P to the deliverer A and the delivery request proof 21a (see A3) transmitted from the deliverer A to the locking controlling apparatus 20 (determining unit 23). For example, the service functioning unit 22 may confirm, through verification, that the delivery request proof 21a is not modified and is signed by the sender P.

As illustrated in FIG. 9, the service functioning unit 22 may verify the electronic signature of the sender P assigned to the receiver proof 21b (see A1) transmitted from the sender P to the receiver B and the receiver proof 21b (see A2) transmitted from the receiver B to the locking controlling apparatus 20 (determining unit 23). For example, the service functioning unit 22 may confirm, through verification, that the destination identification proof 21b is not modified and is signed by the sender P.

If the delivery request proof 21a or the destination identification proof 21b is not modified and is signed by the sender P, the service functioning unit 22 may output the proof to the determining unit 23. On the other hand, when the delivery request proof 21a or the destination identification proof 21b is modified or is not signed by the sender P, the service functioning unit 22 may output the failure in the verification of the electronic signature, as an error, and terminate the process.

This makes the service functioning unit 22 possible to suppress fraud such as spoofing of the sender 12 or 15 by a malicious user and also to guarantee that the sender 12 or 15 is a rightful user.

(Method of Transmitting Destination Identification Proof 21b)

The description of A2, A2', A2" of FIGS. 3 and 4 assumes that, if one or both of the above (i) and (ii) are satisfied, the receiver 18 (or the service system) transmits the destination identification proof 1b, 1b', 1b" (21b) to the locking controlling apparatus 10 (20).

Figure 10:
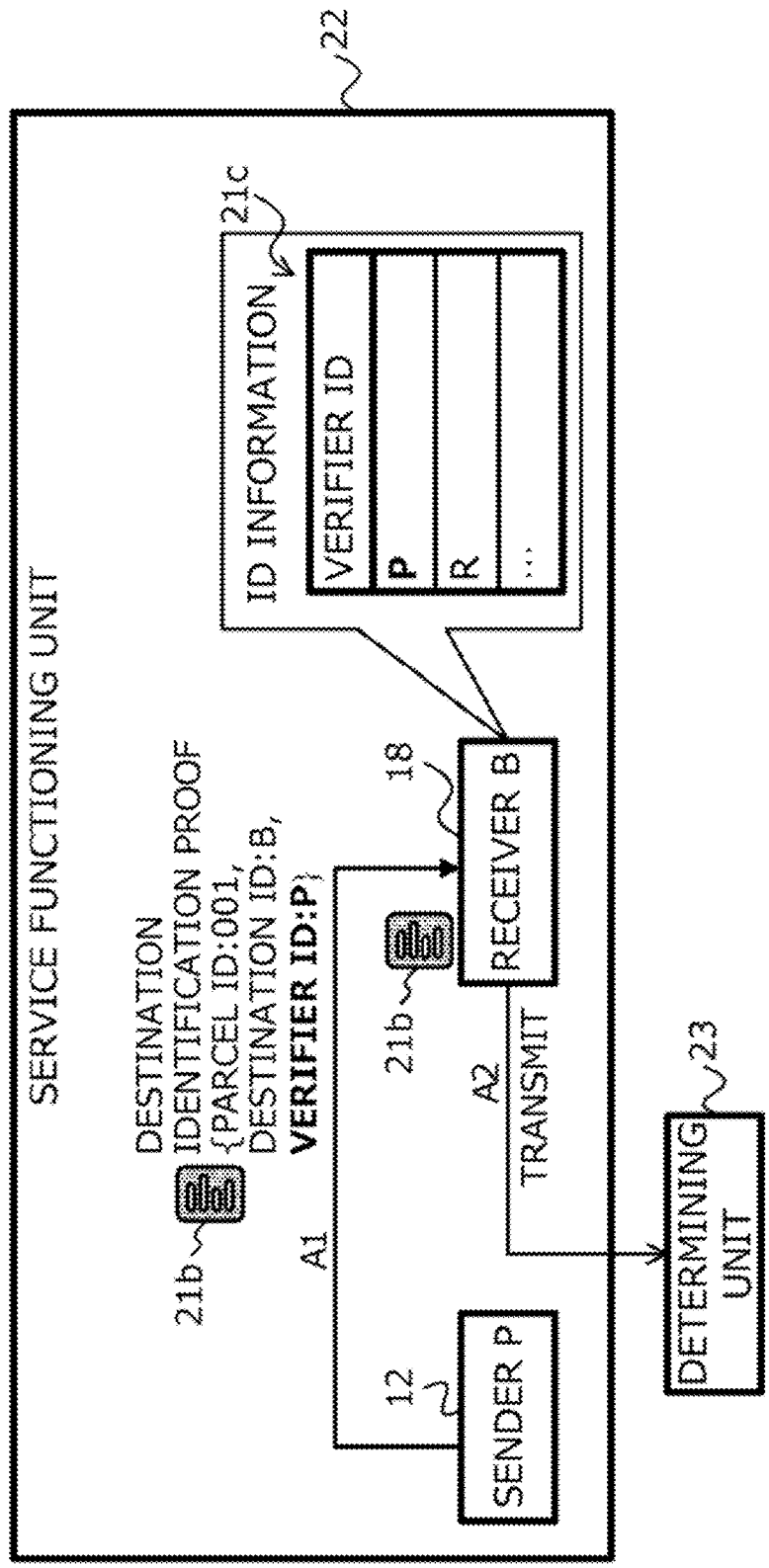
FIG. 10 is a diagram illustrating an example of an outputting process of a destination identification proof according to a first scheme.
Figure 12:
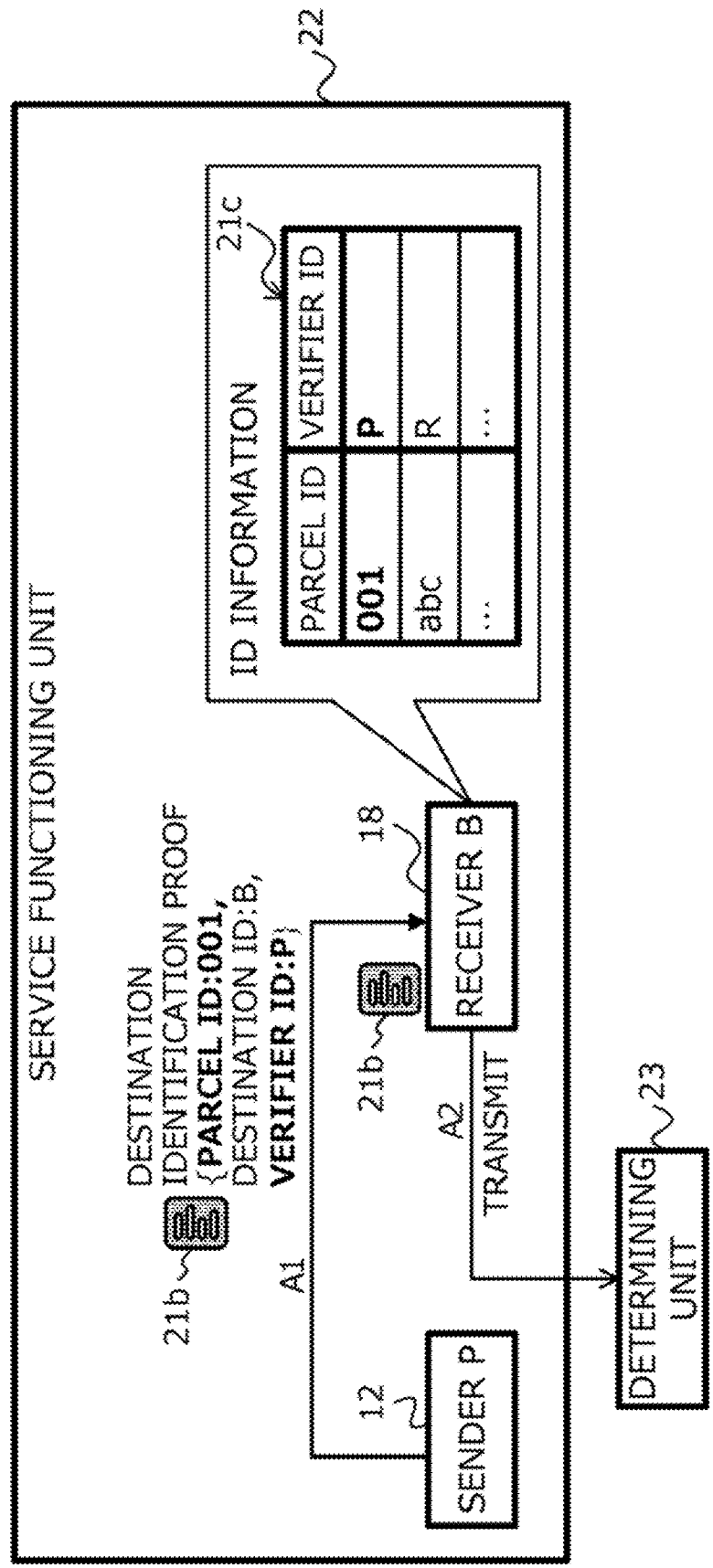
FIG. 12 is a diagram illustrating an example of an outputting process of a destination identification proof according to a second scheme.

For example, this process may be performed in the scheme illustrated in FIG. 10 or 12 by the service functioning unit 22. In other words, the service functioning unit 22 may determine whether one or both of the above (i) and (ii) are satisfied, and may omit the intervention of determination made by the receiver 18.

a) First Scheme:

FIG. 10 is a diagram illustrating an example of an outputting process of a destination identification proof 21b according to a first scheme. As illustrated in FIG. 10, upon receipt of the destination identification proof 21b from the sender 12 (or 15) (see A1), the service functioning unit 22 may refer to the ID information 21c.

In an example of the first scheme, as illustrated in FIG. 10, the ID information 21c is information, for each receiver 18, including a verifier ID that permits transmission of the destination identification proof 21b, i.e., information of a list of reliable verifier IDs. In other words, the ID information 21c illustrated in FIG. 10 is an example of first information that stores identification information of one or more senders permitted to store parcels. The ID information 21c may be generated in advance by the service functioning unit 22 on the basis of the registration information of the user or the like, or may be registered by the receiver 18, for example. For convenience, the ID information 21c is expressed in a table format, but is not limited to this format. Alternatively, the ID information may be stored in various formats such as a Database (DB) and an array.

The service functioning unit 22 may determine whether or not the verifier ID of the destination identification proof 21b received from the sender 12 (or 15) is included in the ID information 21c.

Then, if the verifier ID of the received destination identification proof 21b is included in the ID information 21c, the service functioning unit 22 may determine that the above (ii) is satisfied and output the destination identification proof 21b to the determining unit 23 (see A2). Upon receipt of the destination identification proof 21b, the determining unit 23 may perform a determining process.

On the other hand, if the verifier ID of the destination identification proof 21b is not included in the ID information 21c, the service functioning unit 22 may suppress outputting of the destination identification proof 21b to the determining unit 23.

Incidentally, as a result of suppressing the output of the destination identification proof 21b by the service functioning unit 22, the determining unit 23 sometimes fails in determining whether to unlock the locker 11 (i.e., determines not to unlock the locker 11). In this case, the deliverer 13 cannot unlock the locker 11 and carry back the parcel.

In order to avoid such a situation, for example, the service functioning unit 22 and the determining unit 23 may request the receiver 18 to transmit the destination identification proof 21b.

Figure 11:
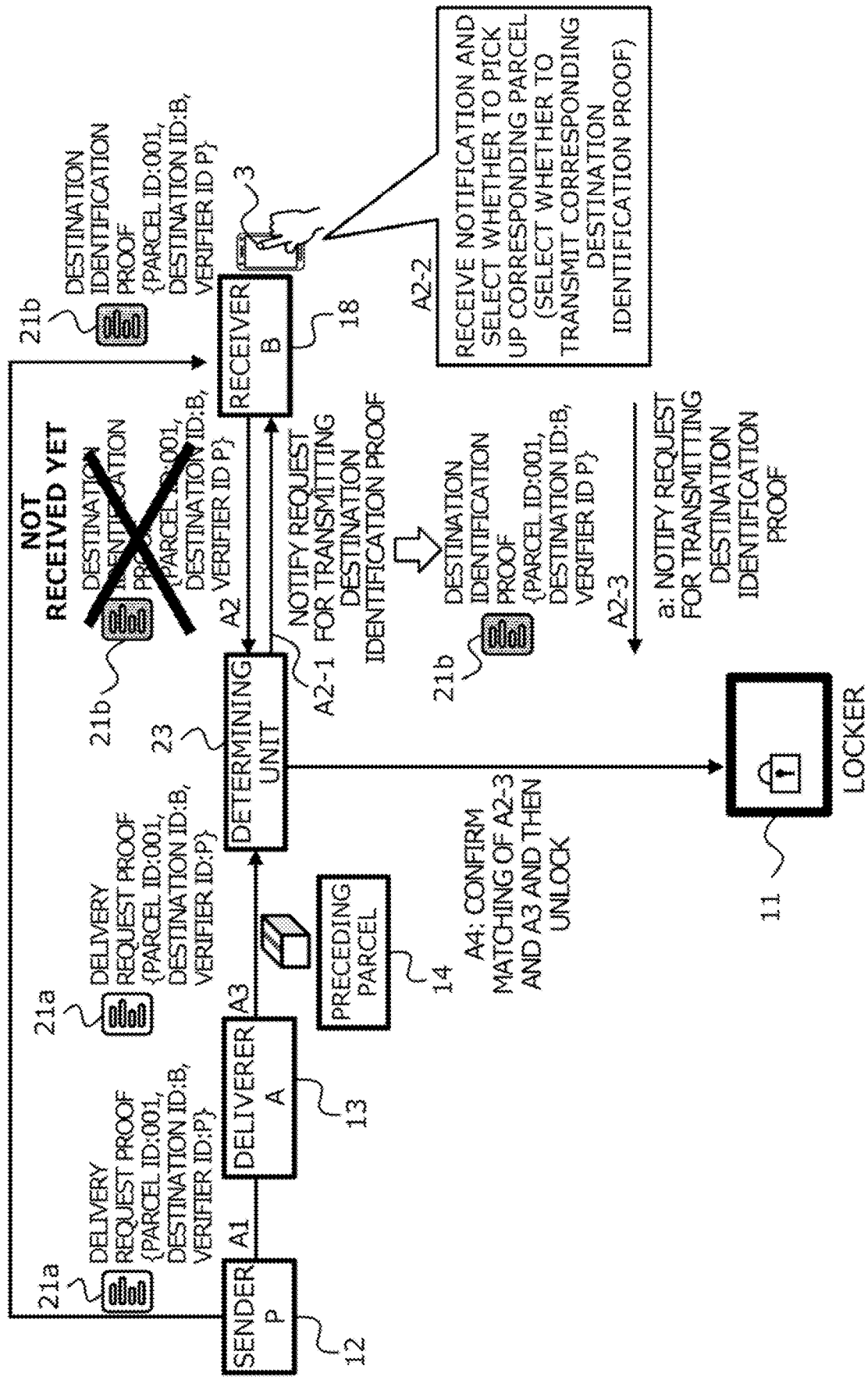
FIG. 11 is a diagram illustrating an example of a transmission requesting process for a destination identification proof.

FIG. 11 is a diagram illustrating an example of a transmission requesting process for a destination identification proof. In FIG. 11, it is assumed that the determining unit 23 determines that the deliverer 13 has not received the destination identification proof 21b which completely matches the parameters of the delivery request proof 21a of the parcel to be deposited.

If not receiving the destination identification proof 21b, the determining unit 23 may request, via the service functioning unit 22, the terminal 3 (second terminal) of the receiver 18 to notify the destination identification proof 21b (see A2-1). The notification may include the parameters of the delivery request proof 21a, i.e., the parcel ID, the destination ID, and the verifier ID.

In response to the notification from the determining unit 23, the receiver B selects, on the terminal 3, whether or not to receive the corresponding parcel, and if determining to receive the parcel, transmits the destination identification proof 21b to the determining unit 23 via the service functioning unit 22 (see A2-2).

The determining unit 23 confirms that the parameters of the destination identification proof 21b received from the receiver 18 match those of the delivery request proof 21a, and then may determine to unlock the locker 11 and instruct the locker controlling unit 24 to unlock the locker (see A4).

b) Second Scheme:

FIG. 12 is a diagram illustrating an example of an outputting process of the destination identification proof 21b according to a second scheme. As illustrated in FIG. 12, upon receipt of the destination identification proof 21b from the sender 12 (or 15) (see A1), the service functioning unit 22 may refer to the ID information 21c.

In an example of the second scheme, as illustrated in FIG. 12, the ID information 21c is a list including combinations each having a parcel ID to be received and the verifier ID of the sender 12 or 15 that issues the destination identification proof 21b of the parcel, for each receiver 18. In other words, the ID information 21c illustrated in FIG. 12 is an example of the second information containing a combination of identification information of a target parcel that is to be received by the receiver and identification information of the sender of the target parcel.

The ID information 21c of the second scheme may be generated in advance by the service functioning unit 22 on the basis of the registration information of the user or the like, or may be registered by the receiver 18, for example. Alternatively, the ID information 21c may be generated or updated by an external system such as an EC site cooperating with the locking controlling apparatus 20. For example, the service functioning unit 22 may issue, to the external system, an access token that gives the writing right into the ID information 21c. For example, the external system may write a combination of the parcel ID and the verifier ID into the ID information 21c of the receiver 18 when the parcel destined for the receiver 18 occurs.

The service functioning unit 22 may determine whether or not the combination the parcel ID and the verifier ID of the destination identification proof 21b received from the sender 12 (or 15) is included in the ID information 21c.

Then, if the combination of the parcel ID and the verifier ID of the received destination identification proof 21b is included in the ID information 21c, the service functioning unit 22 may determine that both (i) and (ii) are satisfied and output the destination identification proof 21b to the determining unit 23 (see A2). Upon receipt of the destination identification proof 21b, the determining unit 23 may carry out a determining process.

On the other hand, if the combination of the parcel ID and the verifier ID of the received destination identification proof 21b is not included in the ID information 21c, the service functioning unit 22 may suppress outputting of the destination identification proof 21b to the determining unit 23.

According to the second scheme, the validity of the destination identification proof 21b can be determined more strictly than in the first scheme (FIG. 10).

Instead of the second scheme, the service functioning unit 22 may determine whether or not the parcel ID of the destination identification proof 21b satisfies the above (i) by referring to information including a list of parcel IDs to be received (i.e., information including the item of "parcel ID" in the ID information 21c of FIG. 12). When the above (i) is satisfied, the service functioning unit 22 may omit the determination of the verifier ID and output the destination identification proof 21b to the determining unit 23 (see A2).

In this manner, by determining whether or not the service functioning unit 22 outputs the destination identification proof 21b to the determining unit 23, it is possible to avoid a delay of the unlocking of the locker 11 due to waiting for the determination of the receiver 18 (i.e., due to making the deliverer 13 or 16 wait).

In addition, by comparing the destination identification proof 21b with the ID information 21c exemplified by the first scheme (FIG. 10) or the second scheme (FIG. 12), the validity of the destination identification proof 21b can be determined more accurately than the determination by a person, i.e., the receiver 18.

Also the second scheme may adopt the scheme illustrated in FIG. 11.

(Example of Verification Intensifying Scheme in Receiving Process)

Figure 13:
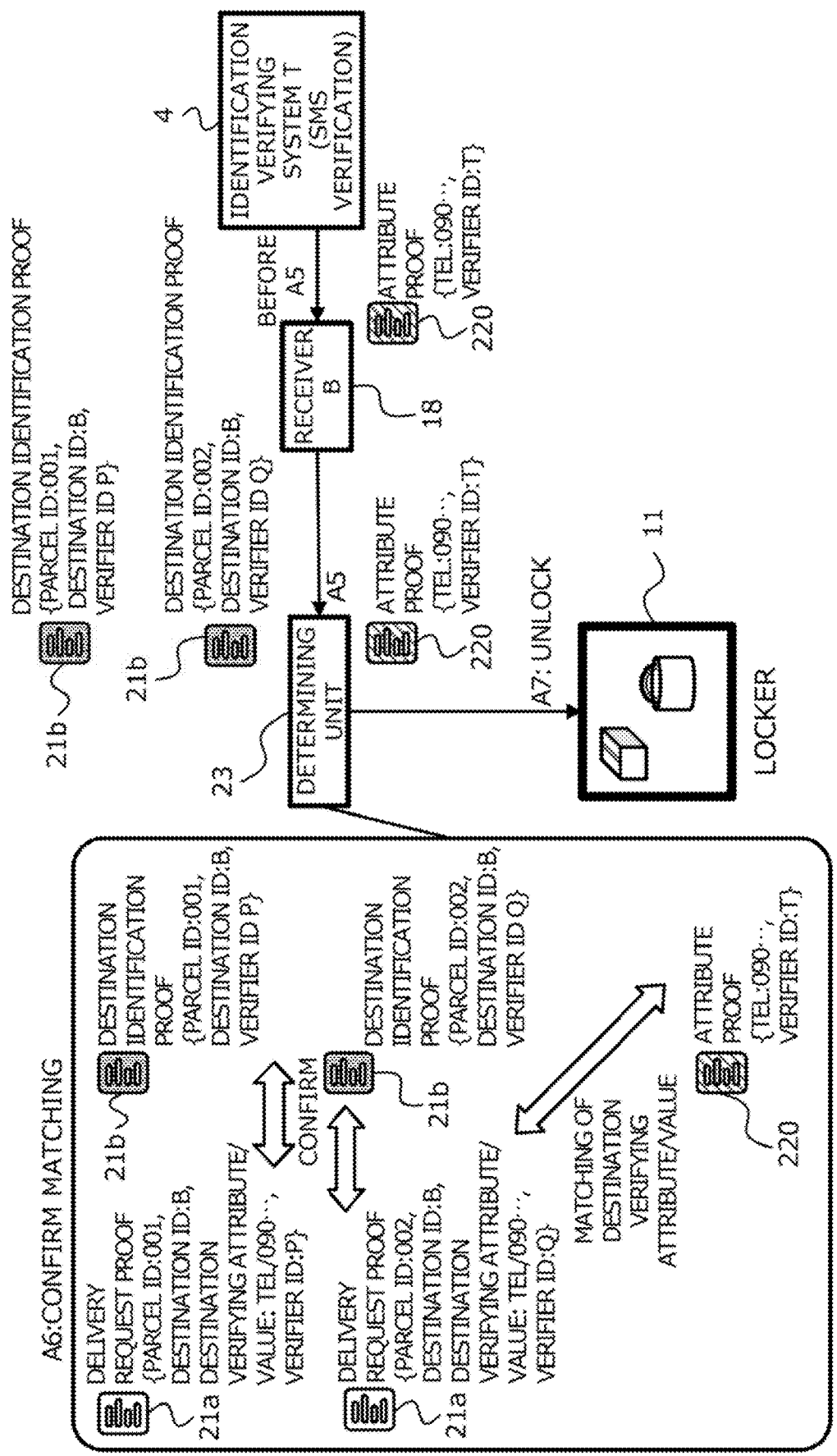
FIG. 13 is a diagram illustrating an example of a verification intensifying scheme in a receiving process.

FIG. 13 is a diagram illustrating an example of a verification intensifying scheme in the receiving process.

As illustrated in FIG. 13, in order to intensify the verification in the receiving process, the service functioning unit 22 may add a destination verifying attribute and a destination verifying attribute value, for example, as parameters of the delivery request proof 21a. The destination verifying attribute and the destination verifying attribute value are examples of the verifying attribute and the attribute value of the receiver. The destination verifying attribute and the destination verifying attribute value are an attribute and the value of the attribute to verify the receiver 18 and illustratively may be the destination verifying attribute "TEL (telephone)" and the value "090-xxxx-xxxx (telephone number)".

For example, the service functioning unit 22 may instruct an identification verifying system 4 to notify the receiver 18 of the attribute proof 220 corresponding to the destination verifying attribute and the destination verifying attribute value before outputting the destination identification proof 21b to the determining unit 23. The identification verifying system 4 is, for example, an external verifying system of the locking controlling apparatus 20, and is a system that verifies the receive 18 in a verifying scheme suitable for the destination verifying attribute. As an example, if the destination verifying attribute is a telephone, the identification verifying system 4 may perform SMS (Short Message Service) verification on the destination verifying attribute value.

When the receiver B receives the parcel, the service functioning unit 22 may output an attribute proof 220 to the determining unit 23 in addition to the destination identification proof 21b. The attribute proof 220 may include a combination of a destination verifying attribute, a destination verifying attribute value, and a verifier ID (e.g., ID "T" to identify the identification verifying system 4).

In determining whether or not all the parameters of the delivery request proof 21a match those of the destination identification proof 21b, the determining unit 23 may determine whether or not the destination verifying attribute and the destination verifying attribute value of the delivery request proof 21a match the attribute proof 220 (see A6).

By using the attribute proof 220 in this manner, the determination whether to unlock the locker 11 can be performed more strictly. Further, even if, for example, the login information (login ID and password, etc.) of the receiver 18 to the service system is leaked to a malicious user, issuing of the attribute proof 220 before the determining unit 23 makes the unlocking determination makes it possible to avoid unscrupulous obtaining of the parcel by the malicious user because the attribute proof 220 does not reach the user.

The service functioning unit 22 add a destination verifying attribute and a destination verifying attribute value, for example, also as parameters of the destination identification proof 21b. This makes it possible to prepare an appropriate attribute proof 220 for a receiver 18 having multiple destination verifying attribute values (e.g., multiple telephone number) before the receiver 18 accesses the locking controlling apparatus 20, for example.

Figure 14:
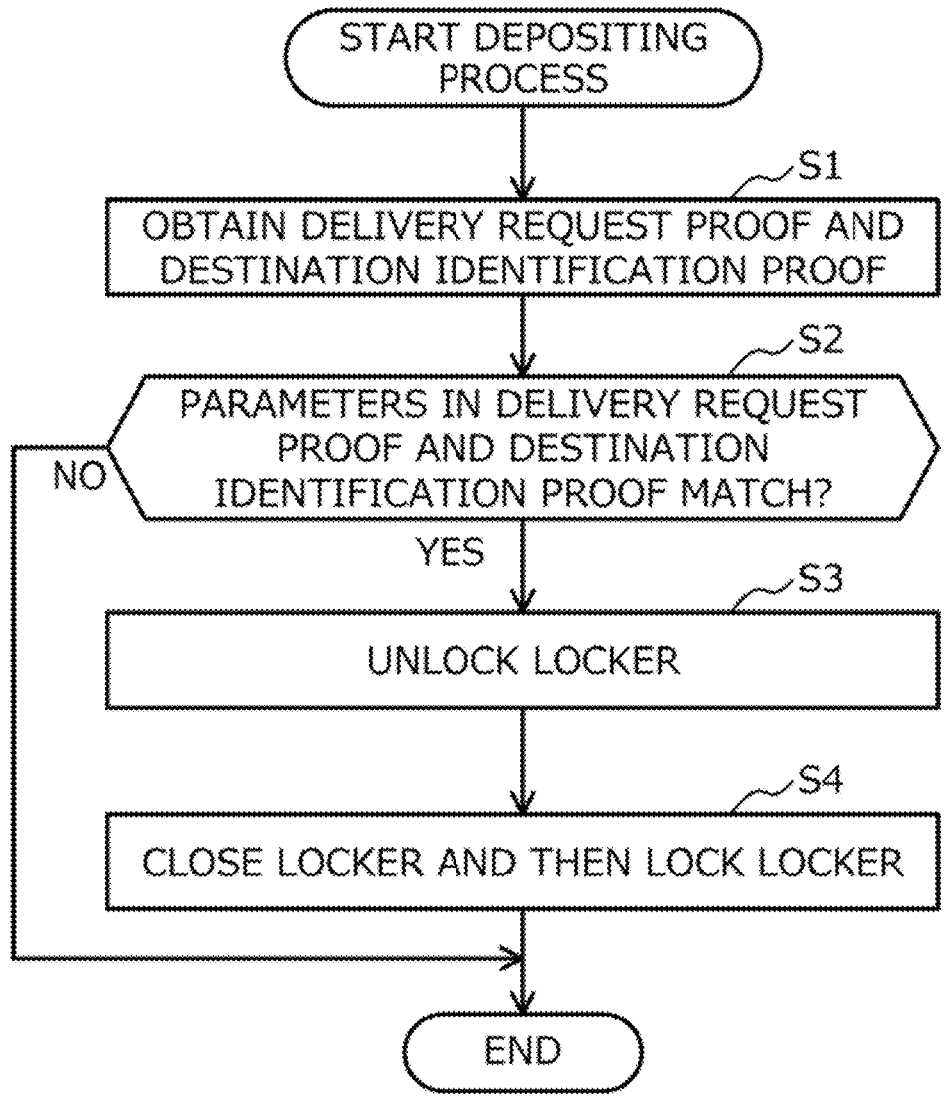
FIG. 14 is a flow diagram illustrating an example of operation of a depositing process.
Figure 15:
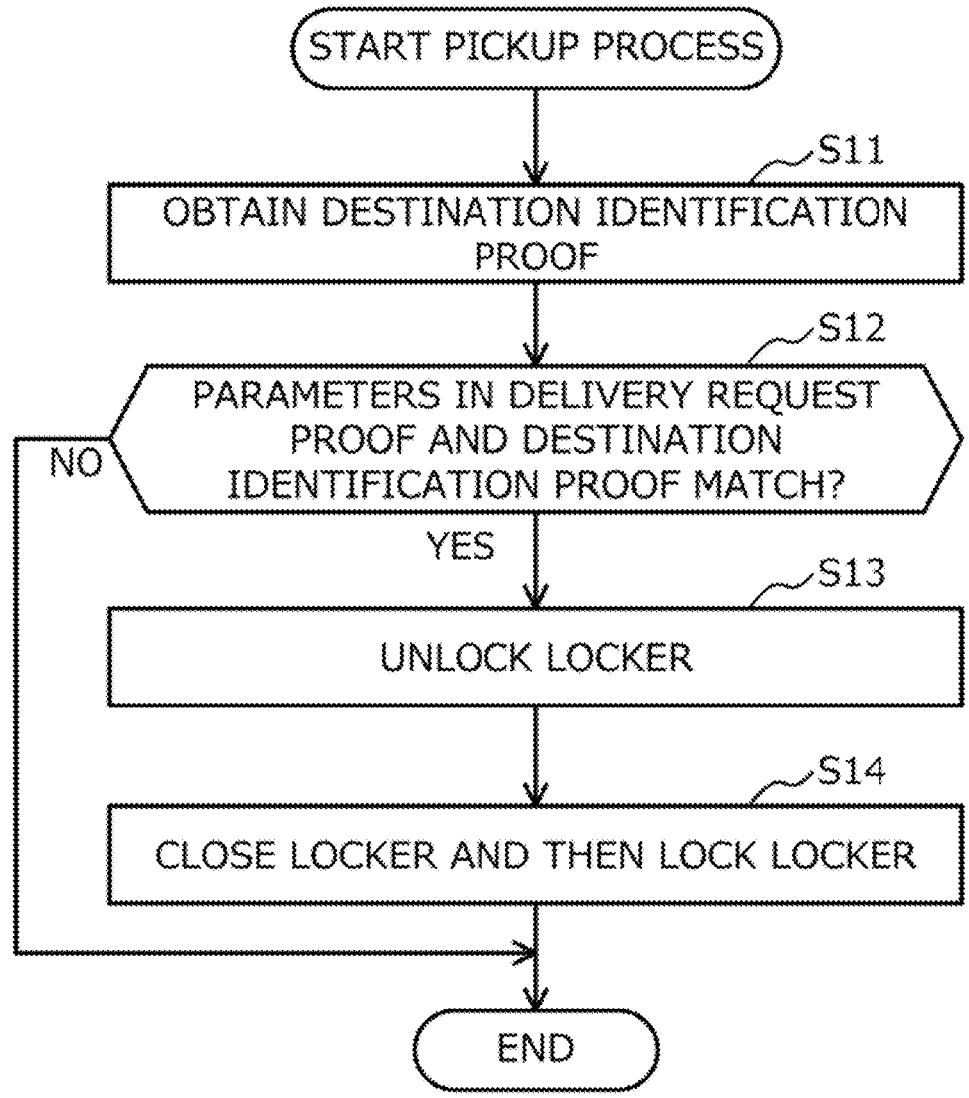
FIG. 15 is a flow diagram illustrating an example of operation of a pickup process.

<1-4> Example of Operation:

Next, description will now be made in relation to example of operation of the locker controlling system 1 according to the one embodiment. FIG. 14 is a flow diagram illustrating an example of operation of the depositing process; and FIG. 15 is a flow diagram illustrating an example of operation of the pickup process.

<1-4-1> Example of Operation of Depositing Process:

As illustrated in FIG. 14, the service functioning unit 22 obtains a delivery request proof 21a, which is issued from the sender 12 and is notified to the deliverer 13 depositing the parcel, and the destination identification proof 21b, which is issued by the sender 12 and is determined to be received by the receiver 18 (Step S1).

The determining unit 23 determines whether or not the parameters of the delivery request proof 21*a* match those of the destination identification proof 21*b* (Step S2), and if the parameters do not match between the proofs (NO in Step S2), notifies the deliverer 13 that the locker 11 is not to be unlocked, and the process ends.

If the parameters match (YES in Step S2), the determining unit 23 determines to unlock the locker 11. The locker controlling unit 24 unlocks the locker 11 in response to the determination (Step S3). When the locker 11 is closed, the locker controlling unit 24 locks the locker 11 (Step S4), and the process ends.

<1-4-2> Example of Operation of Pickup Process:

As illustrated in FIG. 15, the service functioning unit 22 obtains the destination identification proof 21*b* that the receiver 18 notifies in picking up the parcel (Step S11).

The determining unit 23 determines whether or not the parameters of the delivery request proof 21*a* of a parcel destined for the receiver 18 matches those of the receiver proof 21*b* (Step S12), and if the parameters do not match between the proofs (NO in Step S12), notifies the deliverer 13 that the locker 11 is not to be unlocked, and the process ends.

If the parameters match (YES in Step S12), the determining unit 23 determines to unlock the locker 11. The locker controlling unit 24 unlocks the locker 11 in response to the determination (Step S13). When the locker 11 is closed, the locker controlling unit 24 locks the locker 11 (Step S14), and the process ends.

<2> Miscellaneous:

The technique of the above one embodiment can be changed and modified as follows.

For example, the service functioning unit 22, the determining unit 23, and the locker controlling unit 24 included in the locking controlling apparatus 20 illustrated in FIG. 8 may be combined in any combination, or may be divided.

The locking control apparatus 20 illustrated in FIG. 8 may have a configuration (system) that achieves each processing function by multiple apparatuses cooperating with each other via a network. As an example, the memory unit 21 may be a DB server, the service functioning unit 22 may be a Web server or an application server, and the determining unit 23 and the locker controlling unit 24 may be an application server. In this case, the processing function as the locking controlling apparatus 20 may be achieved by the DB server, the application server, and the web server cooperating with one another via a network.

Further, the one embodiment assumes that the sender and the deliverer are different users, but users are not limited to this. Alternatively, the method according to the one embodiment can be applied even when the sender and the deliverer are the same user as in the case where the deliverer issues the delivery request proof 21*a* to itself. In other words, the sender or the deliverer is an example of the transmission source of a parcel.

In one aspect, the present invention can inhibit a steal of a preceding parcel by a deliverer pretending to deliver a subsequent parcel.

Throughout the specification, the claims, the indefinite article "a" or "an" does not exclude a plurality.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A locker apparatus comprising:
    a memory; and
    a processor coupled to the memory, the processor being configured to execute a process including:
        first obtaining, from a terminal of a deliverer of a parcel that stores the parcel into a locker, notification of a first proof issued from a transmission source of the parcel to the deliverer, the first proof including identification information of the parcel, identification information of a receiver of the parcel, and identification information of the transmission source;
        second obtaining notification of a second proof issued from the transmission source to the receiver, the second proof including identification information of the parcel, identification information of the receiver, and identification information of the transmission source in accordance with permission to store the parcel into the locker, the permission indicating that validity of at least one of the parcel and the transmission source is confirmed; and
        unlocking the locker when content of the first proof matches content of the second proof.

2. The locker apparatus according to claim 1, wherein the unlocking includes,
    when the content of the first proof matches the content of the second proof,
    in a case where, under a circumstance where a preceding parcel exists in the locker, the identification information of the transmission source in the first proof matches identification of a transmission source of the preceding parcel, unlocking the locker.

3. The locker apparatus according to claim 1, wherein the memory stores first information including identification information of one or more transmission sources permitted to store the parcel into the locker; and
    the second obtaining includes, when identification information matching the identification information of the transmission source in the second proof is determined to be included in the first information with reference to the first information, obtaining the notification of the second proof.

4. The locker apparatus according to claim 1, wherein the memory stores second information including a combination of identification information of a target parcel that is to be received by the receiver and identification information of the transmission source of the target parcel; and
    the second obtaining includes, when a combination matching the identification information of the parcel and the identification information of the transmission source in the second proof is determined to be included in the second information with reference to the second information, obtaining the notification of the second proof.

5. The locker apparatus according to claim 1, wherein the process further includes:
    requesting, when the processor does not obtain the notification of the second proof, a terminal of the receiver to notify the second proof;

determining, when the processor receives the notification of the second proof from the terminal of the receiver in response to the requesting, whether or not the content of the first proof matches the content of the second proof.

6. The locker apparatus according to claim 1, wherein
the process further includes comparing, when the processor is notified of the second proof from a terminal of the receiver that receives the parcel from the locker, the content of the first proof relating to a first parcel stored in the locker with the content of the second proof, and
the unlocking includes unlocking the locker when the content of the first proof matches the content of the second proof as a result of the comparing.

7. The locker apparatus according to claim 6, wherein
the first proof includes a verifying attribute and an attribute value of the receiver; and
the process further includes:
   obtaining an attribute proof issued to the receiver along with the notification of the second proof, and
   comparing contents of a first proof relating to a second parcel stored in the locker with contents of the second proof and the attribute proof, and
the unlocking includes unlocking the locker when the contents of the first proof match the contents of the second proof and the attribute proof as a result of the comparing.

8. A computer-implemented controlling method comprising:
   first obtaining, from a terminal of a deliverer of a parcel that stores the parcel into a locker, notification of a first proof issued from a transmission source of the parcel to the deliverer, the first proof including identification information of the parcel, identification information of a receiver of the parcel, and identification information of the transmission source;
   second obtaining notification of a second proof issued from the transmission source to the receiver, the second proof including identification information of the parcel, identification information of the receiver, and identification information of the transmission source in accordance with permission to store the parcel into the locker, the permission indicating that validity of at least one of the parcel and the transmission source is confirmed; and
   unlocking the locker when content of the first proof matches content of the second proof.

9. The computer-implemented controlling method according to claim 8, wherein
the unlocking includes,
when the content of the first proof matches the content of the second proof,
in a case where, under a circumstance where a preceding parcel exists in the locker, the identification information of the transmission source in the first proof matches identification of a transmission source of the preceding parcel, unlocking the locker.

10. The computer-implemented controlling method according to claim 8, further comprising
referring to a memory that stores first information including identification information of one or more transmission sources permitted to store the parcel into the locker, wherein
the second obtaining includes, when identification information matching the identification information of the transmission source in the second proof is determined to be included in the first information, obtaining the notification of the second proof.

11. The computer-implemented controlling method according to claim 8, further comprising
referring to a memory that stores second information including a combination of identification information of a target parcel that is to be received by the receiver and identification information of the transmission source of the target parcel, wherein
the second obtaining includes, when a combination that matching the identification information of the parcel and the identification information of the transmission source in the second proof is determined to be included in the second information, obtaining the notification of the second proof.

12. The computer-implemented controlling method according to claim 8, further comprising:
requesting, when the processor does not obtain the notification of the second proof, a terminal of the receiver to notify the second proof;
determining, when the processor receives the notification of the second proof from the terminal of the receiver in response to the requesting, whether or not the content of the first proof matches the content of the second proof.

13. The computer-implemented controlling method according to claim 8, further comprising
comparing, when the processor is notified of the second proof from a terminal of the receiver that receives the parcel from the locker, the content of the first proof relating to a first parcel stored in the locker with the content of the second proof, wherein
the unlocking includes unlocking the locker when the content of the first proof matches the content of the second proof as a result of the comparing.

14. The computer-implemented controlling method according to claim 13, wherein
the first proof includes a verifying attribute and an attribute value of the receiver; and
the computer-implemented controlling method further comprises:
   obtaining an attribute proof issued to the receiver along with the notification of the second proof, and
   comparing contents of a first proof relating to a second parcel stored in the locker with contents of the second proof and the attribute proof, and
the unlocking includes unlocking the locker when the contents of the first proof match the contents of the second proof and the attribute proof as a result of the comparing.

15. A non-transitory computer-readable recording medium having stored therein a controlling program for causing a computer to execute a process comprising:
   first obtaining, from a terminal of a deliverer of a parcel that stores the parcel into a locker, notification of a first proof issued from a transmission source of the parcel to the deliverer, the first proof including identification information of the parcel, identification information of a receiver of the parcel, and identification information of the transmission source;
   second obtaining notification of a second proof issued from the transmission source to the receiver, the second proof including identification information of the parcel, identification information of the receiver, and identification information of the transmission source in accordance with permission to store the parcel into the locker, the permission indicating that validity of at least one of the parcel and the transmission source is confirmed; and unlocking the locker when content of the first proof matches content of the second proof.

16. The non-transitory computer-readable recording medium according to claim 15, wherein the unlocking includes, when the content of the first proof matches the content of the second proof, in a case where, under a circumstance where a preceding parcel exists in the locker, the identification information of the transmission source in the first proof matches identification of a transmission source of the preceding parcel, unlocking the locker.

17. The non-transitory computer-readable recording medium according to claim 15, further comprising referring to a memory that stores first information including identification information of one or more transmission sources permitted to store the parcel into the locker, wherein the second obtaining includes, when identification information matching the identification information of the transmission source in the second proof is determined to be included in the first information, obtaining the notification of the second proof.

18. The non-transitory computer-readable recording medium according to claim 15, further comprising referring to a memory that stores second information including a combination of identification information of a target parcel that is to be received by the receiver and identification information of the transmission source of the target parcel, wherein the second obtaining includes, when a combination matching the identification information of the parcel and the identification information of the transmission source in the second proof is determined to be included in the second information, obtaining the notification of the second proof.

19. The non-transitory computer-readable recording medium according to claim 15, further comprising:

requesting, when the processor does not obtain the notification of the second proof, a terminal of the receiver to notify the second proof;

determining, when the processor receives the notification of the second proof from the terminal of the receiver in response to the requesting, whether or not the content of the first proof matches the content of the second proof.

20. The non-transitory computer-readable recording medium according to claim 15, further comprising comparing, when the processor is notified of the second proof from a terminal of the receiver that receives the parcel from the locker, the content of the first proof relating to a first parcel stored in the locker with the content of the second proof, wherein the unlocking includes unlocking the locker when the content of the first proof matches the content of the second proof as a result of the comparing.

* * * * *